US012252970B2

(12) United States Patent
Johnson et al.

(10) Patent No.: US 12,252,970 B2
(45) Date of Patent: Mar. 18, 2025

(54) EXTRACTION AND INTEGRATION OF WASTE HEAT FROM ENHANCED GEOLOGIC HYDROGEN PRODUCTION

(71) Applicant: Koloma, Inc., Dublin, OH (US)

(72) Inventors: Peter L. Johnson, Dublin, OH (US); Thomas Darrah, Dublin, OH (US)

(73) Assignee: KOLOMA, INC., Denver, CO (US)

( * ) Notice: Subject to any disclaimer, the term of this patent is extended or adjusted under 35 U.S.C. 154(b) by 0 days.

(21) Appl. No.: 18/206,966

(22) Filed: Jun. 7, 2023

(65) Prior Publication Data

US 2023/0392485 A1 Dec. 7, 2023

Related U.S. Application Data

(60) Provisional application No. 63/349,897, filed on Jun. 7, 2022, provisional application No. 63/349,883, filed
(Continued)

(51) Int. Cl.
*C01B 3/02* (2006.01)
*C01B 3/06* (2006.01)
(Continued)

(52) U.S. Cl.
CPC ............ *E21B 43/2405* (2013.01); *C01B 3/06* (2013.01); *E21B 36/001* (2013.01);
(Continued)

(58) Field of Classification Search
CPC .... E21B 43/2405; E21B 43/27; E21B 36/001; E21B 36/008; E21B 43/164;
(Continued)

(56) References Cited

U.S. PATENT DOCUMENTS 4,382,912 A 5/1983 Madgavkar et al.
7,426,959 B2 9/2008 Wang et al.
(Continued)

FOREIGN PATENT DOCUMENTS

| CN | 214221410 U | 9/2021 |
|---|---|---|
| CN | 114506817 A | 5/2022 |
| WO | 2011034677 A2 | 3/2011 |

OTHER PUBLICATIONS

Non-Final Office Action for U.S. Appl. No. 18/133,889 mailed Apr. 25, 2024.
(Continued)

*Primary Examiner* — Taras P Bemko
(74) *Attorney, Agent, or Firm* — K&L Gates LLP

(57) ABSTRACT

A method of producing hydrogen and sequestering carbon or sulfur includes generating a fluid including at least one of water, steam, hydrogen sulfide, carbon dioxide and heat as a byproduct of a surface facility and injecting the fluid into a subsurface formation. The subsurface formation can include a porous rock, in various forms of porosity such as intragranular, intergranular, fracture porosity. The method can further include heating the fluid to stimulate an exothermic reaction of the fluid with components of the subsurface rock formation and produce a hydrogen reaction product and one or more of sulfur minerals from the hydrogen sulfide or carbon minerals from the carbon dioxide. The fluid can be heated to between about 25° C. and about 500° C. The method can also include extracting the hydrogen produced from the reaction of the fluid with the subsurface rock formation and mineralizing at least one of the sulfur or carbon in the porous rock.

20 Claims, 11 Drawing Sheets

Related U.S. Application Data on Jun. 7, 2022, provisional application No. 63/349,901, filed on Jun. 7, 2022.

(51) Int. Cl.
*E21B 36/00* (2006.01)
*E21B 43/16* (2006.01)
*E21B 43/24* (2006.01)
*E21B 43/27* (2006.01)

(52) U.S. Cl.
CPC .......... *E21B 36/008* (2013.01); *E21B 43/164* (2013.01); *E21B 43/27* (2020.05); *C01B 2203/84* (2013.01); *C01B 2203/86* (2013.01)

(58) Field of Classification Search
CPC ....... E21B 41/0064; E21B 43/26; C01B 3/06; C01B 2203/84; C01B 2203/86; C01B 3/061; C01B 3/065
See application file for complete search history.

(56) References Cited

U.S. PATENT DOCUMENTS

| | | | |
|---|---|---|---|
| 8,136,592 | B2 | 3/2012 | Hsu et al. |
| 2003/0010652 | A1 | 1/2003 | Hunt |
| 2004/0146288 | A1 | 7/2004 | Vinegar et al. |
| 2006/0185985 | A1 | 8/2006 | Jones |
| 2007/0298479 | A1 | 12/2007 | Larter et al. |
| 2008/0216774 | A1 | 9/2008 | Fulton et al. |
| 2009/0056941 | A1 | 3/2009 | Valdez |
| 2011/0146982 | A1* | 6/2011 | Kaminsky ............... E21B 43/24 166/272.2 |
| 2011/0220351 | A1 | 9/2011 | Surguchev et al. |
| 2013/0113480 | A1 | 5/2013 | Kadayam et al. |
| 2014/0027119 | A1 | 1/2014 | De et al. |
| 2014/0114576 | A1 | 4/2014 | Jain et al. |
| 2014/0190691 | A1 | 7/2014 | Vinegar et al. |
| 2015/0361833 | A1 | 12/2015 | Hinders et al. |
| 2017/0174512 | A1 | 6/2017 | Oates et al. |
| 2020/0096663 | A1 | 3/2020 | Shetty et al. |
| 2021/0189856 | A1* | 6/2021 | Gates ................... E21B 43/243 |
| 2021/0301658 | A1 | 9/2021 | Zhang et al. |
| 2022/0065103 | A1 | 3/2022 | Rowe |
| 2022/0083048 | A1 | 3/2022 | Cella et al. |
| 2023/0050823 | A1 | 2/2023 | Darrah et al. |
| 2023/0102312 | A1* | 3/2023 | Darrah ................... C01B 3/061 423/658 |
| 2023/0323756 | A1 | 10/2023 | Darrah et al. |

OTHER PUBLICATIONS

Doveton, "Basics of Oil & Gas Log Analysis" [online], 1999 (1999) [retrieved on Jul. 24, 2023]. Retrieved from the internet: <URL:https://www.kgs.ku.edu/PRS/Info/pdf/doveton.PDF>.

International Search Report and Written Opinion dated Oct. 12, 2023 for PCT Application No. PCT/US2023/024711.

International Search Report and Written Opinion for International Application No. PCT/US2023/024721 mailed Oct. 10, 2023.

International Search Report and Written Opinion mailed Aug. 11, 2023 for PCT Application No. PCT/US2023/016610.

International Search Report and Written Opinion mailed Aug. 30, 2023 for International Application No. PCT/US2023/018331.

International Search Report and Written Opinion mailed Aug. 31, 2023 for International Application No. PCT/US2023/024719.

Invitation to Pay Additional Fees dated Aug. 14, 2023 for PCT Application No. PCT/US2023/024711.

Invitation to Pay Additional Fees for International Application No. PCT/US2023/024721 mailed Jul. 26, 2023.

Kelemen, et al., "Engineered carbon mineralization in ultramafic rocks for CO2 removal from Air: Review and New Insights", (2020). Chemical Geology, 550, 119628. https://doi.org/10.1016/j.chemgeo.2020.119628.

McQueen, et al., "Ambient weathering of magnesium oxide for CO2 removal from Air", (2020). Nature Communications, 11(1). https://doi.org/10.1038/s41467-020-16510-3.

Wang, et al., "Enhanced Hydrogen Production with Carbon Storage by Olivine Alteration in CO2-Rich Hydrothermal Environments." Journal of CO2 Utilitzation, vol. 30, 20219, pp. 205-213, https://doi.org/10.1016/j.jcou.2019.02.008.

Worman, et al., "Abiotic hydrogen (H2) sources and sinks near the Mid-Ocean Ridge (MOR) with implications for the subseafloor biosphere", (2020). Proceedings of the National Academy of Sciences, 117(24), 13283-13293. https://doi.org/10.1073/pnas.2002619117 Downloaded from https://www.pnas.org on Apr. 12, 2022.

Worman, Stacey Lynn, "Global Rates of Free Hydrogen (H2) Production by Serpentinization and other Abiogenic Processes within Young Ocean Crust", Department of Earth and Ocean Sciences Duke University, 2015.

\* cited by examiner

EXTRACTION AND INTEGRATION OF WASTE HEAT FROM ENHANCED GEOLOGIC HYDROGEN PRODUCTION

CROSS-REFERENCE TO RELATED APPLICATIONS

This application claims priority to U.S. Provisional Application No. 63/349,901 filed on Jun. 7, 2022, U.S. Provisional Application No. 63/349,897 filed on Jun. 7, 2022, and U.S. Provisional Application No. 63/349,883 filed on Jun. 7, 2022, the disclosure of each of which is incorporated herein in their entirety by this reference.

BACKGROUND

The use of hydrogen as a chemical feedstock and fuel source to replace hydrocarbons and other fossil fuels has been a long term but unattained goal of society. This dream of a hydrogen economy has yet to be obtained primarily because of the long-standing problem in obtaining hydrogen in the amounts and at the costs needed for a viable hydrogen economy. Further, current methods of hydrogen synthesis are extremely carbon and energy intensive. Nonetheless, once formed, hydrogen provides a clean energy source that eliminates the greenhouse gases that are produced from using hydrocarbons, e.g., gas and oil, as an energy source. As a result, various mechanisms for producing low- or negative-carbon or "green" hydrogen are being considered in various industrial sectors. Hydrogen is a very important chemical that is used in various industries and can be extracted from subsurface rock formations.

Subsurface rock formations can include other materials that can be used for energy production. For example, the formations can be rich in elements such as iron or minerals and fluids. Also, the rock formations can include pores that may hold or store any of various products or fluids. Byproducts of processes can be stored or sequestered in the subsurface formation for extended time periods. For example, over the long-term, carbon dioxide can be mineralized to a solid, thus removing it from the atmosphere over geologic timescales. Sequestration can be a climate change mitigation option for near and long term scenarios.

SUMMARY

Embodiments of the present disclosure are related to integrating topside heating, power production, or chemical production processes with various forms of hydrogen generation to a mutual benefit. Some embodiments disclose methods of producing hydrogen from a subsurface rock formation. Some embodiments include sulfur sequestration by mineralization of dihydrogen sulfide, and carbon sequestration by mineralization of carbon dioxide.

In an embodiment, a method of producing hydrogen from a subsurface rock formation is disclosed. The method includes heating a fluid including at least one of dihydrogen sulfide, carbon dioxide, or a mixture thereof within a subsurface rock formation to stimulate an exothermic reaction of the fluid with components of the subsurface rock formation and produce a hydrogen reaction product is disclosed. The method includes extracting the hydrogen produced from the reaction of the fluid with the subsurface rock formation and utilizing at least one of heat produced from the exothermic reaction or the hydrogen product to generate mechanical energy, thermal energy, electrical energy, or chemical reactions. The fluid can further include at least one of water, steam, or a supercritical fluid. Extracting hydrogen produced from the reaction of the fluid with the subsurface rock formation can include extracting heated water from the subsurface formation. In some examples, the fluid can be heated to between about 25° C. and about 500° C. The method can further include injecting a coolant into the subsurface formation. The coolant can include at least one of water or carbon dioxide.

In an embodiment, a method for producing mechanical energy, thermal energy, electrical energy, or chemical reactions is disclosed. The method includes extracting one or more of hydrogen or a heated fluid produced from a reaction of a fluid with a subsurface rock formation. The method includes utilizing at least one of heat produced from an exothermic reaction or the hydrogen product to generate mechanical energy, thermal energy, electrical energy, or chemical reactions. The mechanical or electrical energy can be produced by cycling the hydrogen through a gas turbine or a heated fluid through a steam turbine. Utilizing at least one of heat produced from an exothermic reaction or the hydrogen product to generate mechanical energy, thermal energy, electrical energy, or chemical reactions can include at least one of a steam generator, a turbine, a Rankin cycle plant, an Allam Cycle plant, an economizer, a boiler, or a superheater. The heated fluid can be configured to heat a secondary fluid and the secondary fluid is cycled through the steam turbine, fuel cell, fuel production facility, or chemical production facility. In some examples, the subsurface rock formation can include one or more of iron-rich rock, mafic igneous rock, metamorphosed or hydrothermally altered mafic igneous rock, olivine- or pyroxene-bearing igneous, metamorphic, or sedimentary rock or sediment, metamorphosed or hydrothermally altered olivine- or pyroxene-bearing igneous, metamorphic, or sedimentary rock or sediment, serpentine mineral bearing rock or sediment, partially or completely serpentinized rock, serpentinite, pyrite, iron-rich sandstone, other iron-rich sedimentary rock, or iron-rich sediments. The subsurface rock formation can include a fractured or acid treated porous rock.

In an embodiment, a method to produce hydrogen and sequester carbon or sulfur is disclosed. The method includes generating a fluid that includes at least one of water, steam, hydrogen sulfide, carbon dioxide and heat as a byproduct of a surface facility and heating the fluid to between about 25° C. and about 500° C. The method can further include injecting the fluid into a subsurface rock formation and mineralizing one or more of sulfur from the hydrogen sulfide or carbon from the carbon dioxide in the subsurface rock formation. In some examples, the injection of the fluid and the heating of the fluid is concurrent. For example, the heating can occur within the subsurface rock formation. In some examples, the subsurface rock formation can include a fractured or acid treated porous rock. In some examples, the fluid comprises at least one of steam, water, brine, gray water, wastewater, seawater, or water from a natural geothermal system. Heating the fluid can include generating heat from an iron-rich rock serpentinization/decarbonation reaction. In some examples, the iron-rich rock can include a crushed rock.

In some examples, the reaction can further generate at least one of magnetite, a rare earth element, or a precious metal. The rare earth element can include at least one of Scandium, Yttrium, Lanthanum, Cerium, Praseodymium, Neodymium, Promethium, Samarium, Europium, Gadolinium, Terbium, Dysprosium, Holmium, Erbium, Thulium, Ytterbium, and Lutetium and the precious metal comprises at least one of Iridium, Indium, Gallium, Tellurium, Bismuth, Mercury, Rhenium, Ruthenium, Germanium, Beryllium, Rhodium, Palladium, Osmium, Platinum, Silver, and Gold. In some examples, mineralizing carbon from the carbon dioxide can generate at least 7 kWh of heat per ton of carbon dioxide generated.

In an embodiment, a system for producing hydrogen is disclosed. The system includes a facility configured to produce a fluid or heat as a byproduct; a heat exchanger configured to heat the fluid to between about 25° C. and about 500° C.; a pump configured to pump the fluid into a subsurface formation; and a recovery well fluidly connected to the subsurface formation and configured to remove at least one of a hydrogen gas or a heated fluid from the subsurface formation. The subsurface formation can include a natural geothermal system. The system can further include a gas turbine fluidly connected to the recovery well, the gas turbine configured to produce mechanical energy, thermal energy, electrical energy, or chemical reactions from the hydrogen gas. The system can further include a steam turbine, fuel cell, gas turbine, fuel production facility, chemical production facility, configured to produce mechanical energy, thermal energy, electrical energy, or chemical reactions from the heated fluid from the recovery well. The heated fluid from the subsurface formation can be produced from an iron-rich rock serpentinization and decarbonation reactor and the system further comprises at least one of: a heater, a coal boiler, a carbon dioxide capture system, a heat recovery steam generator, an Allam Cycle power block, a cooler, a methanation facility, a synthetic fuels production facility, or a pre-heater operably coupled to the iron-rich rock serpentinization and decarbonation reactor; and a power generator operable coupled to the at least one heater, a coal boiler, a carbon dioxide capture system, a heat recovery steam generator, an Allam Cycle power block, a cooler, a methanation facility, a synthetic fuels production facility, or pre-heater; wherein the power generator comprises a turbine.

In an example, a method of producing hydrogen and sequestering carbon or sulfur is disclosed. The method includes generating a fluid that includes at least one of water, steam, hydrogen sulfide, carbon dioxide and heat as a byproduct of a surface facility; injecting the fluid into a subsurface formation, the subsurface formation comprising a porous rock; and heating the fluid to stimulate an exothermic reaction of the fluid with components of the subsurface rock formation and produce a hydrogen reaction product and one or more of sulfur from the hydrogen sulfide or carbon from the carbon dioxide. The fluid can be heated to between about 25° C. and about 500° C. The method can further include extracting the hydrogen produced from the reaction of the fluid with the subsurface rock formation and mineralizing at least one of the sulfur or carbon in the porous rock.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Embodiments disclosed herein are related to integrating topside heating, power production, or chemical production processes with various forms of hydrogen generation to a mutual benefit. Hydrogen can be produced from a subsurface rock formation. Although the present specification focuses on hydrogen, carbon dioxide, dihydrogen sulfide, or mixtures of carbon dioxide, dihydrogen sulfide, or other gases, it is understood that the techniques disclosed herein are not so limited and can find application in the generation and extraction of other subsurface materials, including other gases, minerals, or gems.

In some examples, utilization and integration of waste heat and other inputs from adjacent facilities can be accessed for energy and hydrogen production. In other examples, waste heat that is produced in the downhole reactions can also be used in a processing plant. Some embodiments of the present disclosure relate to methods and designs for capturing, utilizing, and integrating waste heat from an above-ground processing plant or reactor. For example, systems and methods for utilization and integration of waste heat and other inputs with adjacent facilities are described in greater detail below.

More particularly, methods and systems for capturing, utilizing, and integrating waste heat can include a mafic rock serpentinization/decarbonation (MRSD) reactor or processing plant. In a MRSD reactor, water, carbon dioxide ($CO_2$), and crushed iron-rich rock can be inputs into the reactor. Enhanced aggregates, including magnetite, rare earth elements (REEs), and precious metals (e.g., cobalt, nickel) along with hydrogen can be the outputs. Such MRSD reactors are located topside and may use mined subsurface iron-rich rock that are collected at the surface as reactants.

In some examples, methods and systems for capturing, utilizing, and integrating waste heat from subsurface reactions can produce geologic hydrogen, enhanced by one or more of $CO_2$ and $H_2S$ mineralization or heat addition to the subsurface. Waste heat can be utilized across many industries for manufacturing, heating, and power production. Waste heat extracted from reactions of subsurface rock is strongly analogous to geothermal heat which can be utilized for industrial heating, building heat, power production, and as a mechanism of energy storage.

Figure 1:
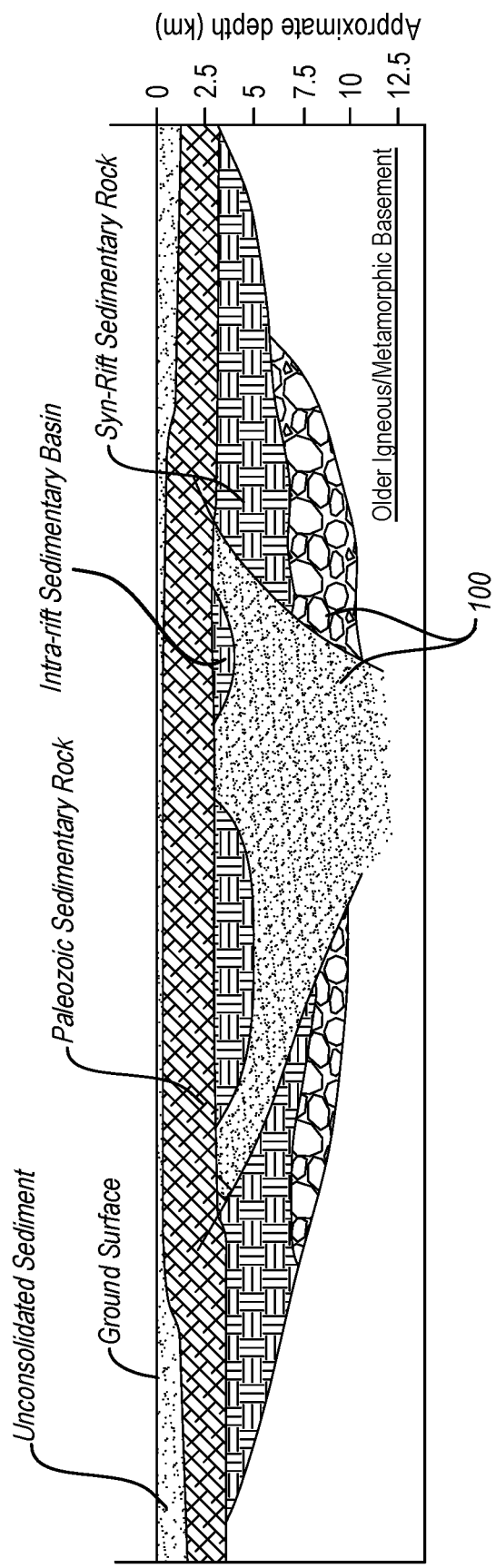
FIG. 1 illustrates a cross-section of mafic rock that can be accessed for heat assisted enhanced hydrogen production, sulfur enhanced hydrogen production, or sulfur-carbon mixture enhanced hydrogen production according to an embodiment.

FIG. 1 illustrates a cross-section of mafic rock 100 in situ that can be accessed for heat assisted enhanced hydrogen production, sulfur enhanced hydrogen production, or sulfur-carbon mixture enhanced hydrogen production according to an embodiment. As shown, mafic rock 100 may be located adjacent to other rock types, such as sedimentary rock, metamorphic rock, igneous rock, or unconsolidated sediment. Accordingly, a well or wells may be utilized to access the mafic rock.

In some embodiments, the production of hydrogen can be from geographies where hydrogen production was limited by a lack of key reactants (i.e., water, heat, carbon dioxide, or dihydrogen sulfide) or not possible on any economically viable manner, or sulfur and carbon mineralization were not possible on any economically viable manner. However, the methods of producing hydrogen described herein can find applicability and provide improvements and benefits to those geographies with excess geothermal heat (e.g., geothermal heat gradient is greater than 20° C./km), and others. For example, producing hydrogen by injecting specifically treated or heated steam, water, hot water, brine, pressurized hot water, gray water, wastewater, seawater, geothermal fluids, geothermal exhaust fluids, or other chemical species, including dihydrogen sulfide, carbon dioxide, or mixture of dihydrogen sulfide and carbon dioxide, into the mafic rock of a subsurface formation can be used to heat the rock to a selected temperature to initiate and maintain reactions for producing hydrogen and other reaction products from the subsurface formation. In some examples, the selected temperature can control the rate of the reaction.

In some embodiments, in the production of natural resources from formations within the earth, a well or borehole can be drilled into the earth to the location where the natural resource is believed to be located. Similarly in the injection of water or the sequestration of dihydrogen sulfide, carbon dioxide, or other greenhouse gases in formations within the earth, a well or borehole is drilled into the earth to the location where water or these gases will be injected, located, and sequestered. These natural resources to be recovered may include hydrogen; helium; carbon dioxide; dihydrogen sulfide; methane or other hydrocarbon gases; a dihydrogen sulfide reservoir; a hydrogen reservoir; a helium reservoir; a carbon dioxide reservoir; a reservoir rich in dihydrogen sulfide; a reservoir rich in hydrocarbons; the natural resource may be fresh water; brackish water; brine; steam; it may be a heat source for geothermal energy; or it may be some other natural resource, ore deposit, mineral, metal, or gem that is located within the ground.

In some examples, a method of producing hydrogen from a subsurface rock formation can include heating a fluid including at least one of dihydrogen sulfide, carbon dioxide, or a mixture thereof within a subsurface rock formation to stimulate an exothermic reaction of the fluid with components of the subsurface rock formation and produce a hydrogen reaction product. In some examples, the fluid can include injecting specifically treated or heated water, steam, a supercritical fluid, brine, pressurized hot water, gray water, wastewater, seawater, geothermal fluids, geothermal exhaust fluids, or other heated thermal fluids combined with dihydrogen sulfide or mixtures of dihydrogen sulfide and carbon dioxide, either as dihydrogen sulfide or mixtures of dihydrogen sulfide and carbon dioxide dissolved in the fluid. The fluid can be temperature controlled by various means at the surface prior to injection into a geological formation or system.

The temperature-controlled fluid can be injected into the subsurface formation. In some examples, the subsurface formation can include an iron-rich rock, mafic igneous rock, metamorphosed or hydrothermally altered mafic igneous rock, olivine- or pyroxene-bearing igneous, metamorphic, or sedimentary rock or sediment, metamorphosed or hydrothermally altered olivine- or pyroxene-bearing igneous, metamorphic, or sedimentary rock or sediment, serpentine mineral bearing rock or sediment, partially or completely serpentinized rock, serpentinite, pyrite, iron-rich sandstone, other iron-rich sedimentary rock, or iron-rich sediments with or without fracturing or other forms of mechanical stimulation.

The embodiments herein provide low-carbon hydrogen production techniques that utilize different injectate fluids heated from sources external to the geological system and rely on one or more of the pyritization or serpentinization reactions described in Table 1 and Table 2 below. The chemical components of the injectate fluid, the heat, or both, may be supplied from topside systems, such as waste from surface installations.

Subsurface hydrogen generation utilizes a selected temperature range for reactions to occur and provides for the utilization of naturally occurring geothermally heated rock or externally produced heat via steam, hot water, other heating fluids, carbon dioxide, $H_2S$, super-critical carbon dioxide, super-critical dihydrogen sulfide, or other means for achieving the selected temperature ranges for hydrogen generation. Various forms of subsurface hydrogen generation may include a cyclical use of water, $CO_2$ or $H_2S$, or various mixtures thereof with other chemical species. The use of the foregoing leads to mineralization that can both sequester $CO_2$, $H_2S$, or both; and favorably adapts the rock chemistry for hydrogen production by pyritization, serpentinization, or mixtures of pyritization and serpentinization, where $CO_2$, $H_2S$, or $CO_2$ and $H_2S$ is periodically injected into the subsurface rock formation. In some examples, the subsurface rock formation can be a fractured or acid treated porous rock. As disclosed in more detail below, waste heat, waste steam, carbon dioxide ($CO_2$), and/or hydrogen sulfide ($H_2S$) from a topside installation may be used to produce hydrogen in a subsurface hydrogen generation process, to sequester one or more of carbon dioxide or dihydrogen sulfide, or both.

In some embodiments, hydrogen can be produced by injecting at least one reactant into the subsurface formation. The reactant can include at least one of dihydrogen sulfide ($H_2S$) for Sulfur Enhanced Hydrogen Production ("SEHP"), or mixtures of $H_2S$ and carbon dioxide ($CO_2$) for Sulfur-Carbon Mixture Enhanced Hydrogen Production ("SC-MEHP"), or specifically treated fluids.

In some embodiments, hydrogen production can be termed Enhanced Hydrogen Production ("EHP"). EHP utilizes a heated fluid to increase the rate of reaction of hydrogen bearing minerals within a rock matrix to produce hydrogen therefrom. The fluid can be formed at the surface prior to injection or below the surface prior to, during, or after injection into a geological formation or system. The heat for the fluid that is heated can be provided by various processes at the surface prior to injection or in the subsurface prior to, during, or after injection into a geological formation and/or porous rock system. In this embodiment, $H_2S$, $CO_2$, or mixtures thereof, alone or when dissolved in or combined with specifically treated injected fluid into the porous rock with or without fracturing, may deliver heat. Water or dihydrogen sulfide present as a reactant in the fluid can stimulate an exothermic reaction of the fluid with components of the subsurface rock formation and produce hydrogen and heat, where the heat is formed from the exothermic nature of the reaction. In some examples, carbon dioxide present in the injected fluid can react with minerals in the subsurface rock formation to produce carbon minerals and sequester carbon dioxide, mineralized sulfur, and mineralized carbon. In other examples, the temperature-controlled fluid can be injected into porous, faulted, or geologically or incipiently fractured subsurface formation with or without fracturing in combination with other forms of mechanical stimulation or other forms of enhanced hydrogen production (e.g., SEHP or SCMEHP).

Figure 2:
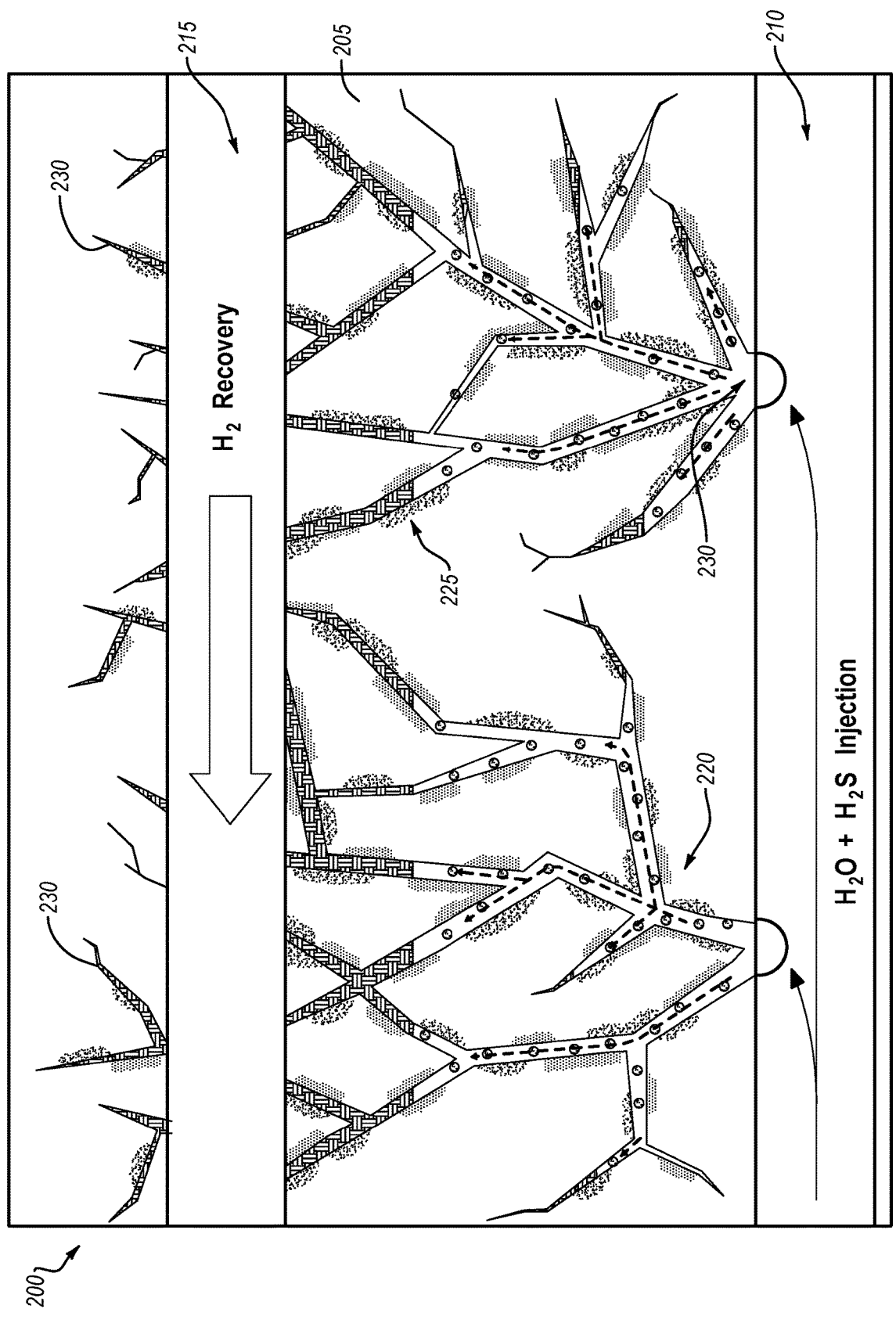
FIG. 2 is a schematic illustration of sulfur enhanced hydrogen production in a subsurface formation, according to an embodiment.
Figure 3:
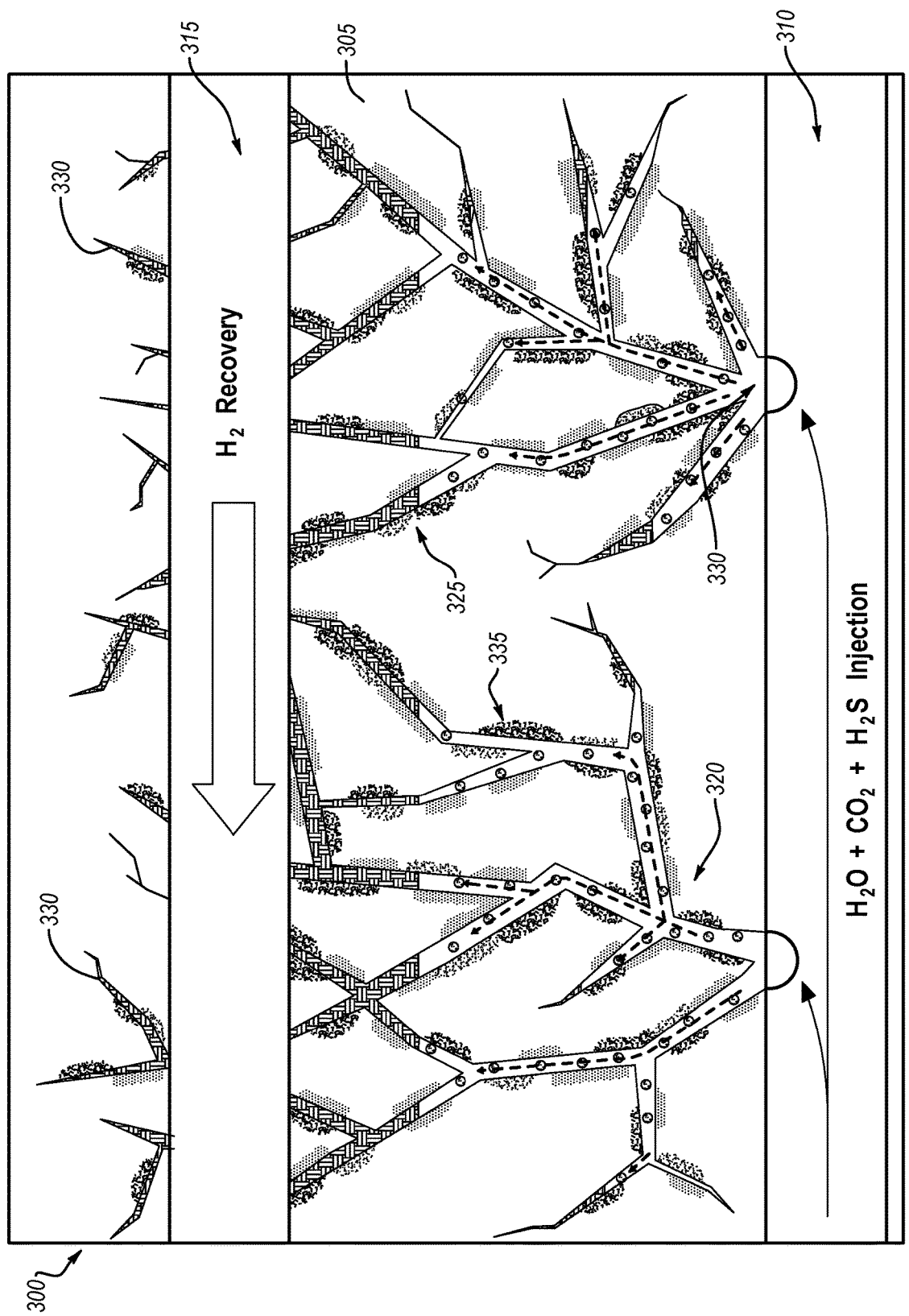
FIG. 3 is a schematic illustration of sulfur-carbon mixture enhanced hydrogen production in a subsurface formation, according to an embodiment.

Referring to FIGS. 2-3, SEHP and SCMEHP can include direct hydrogen production following pyritization reactions. Further, the reactions can increase porosity following fluid-rock interactions (e.g., mineralization of pyrite following iron-rich mineral interactions with dihydrogen sulfide or mineralization of pyrite and/or other sulfide mineral species and/or magnesite and other carbonate mineral species following iron- and magnesium-rich mineral (e.g., olivine and pyroxene) interactions either with dihydrogen sulfide or a combination of dihydrogen sulfide and carbon dioxide), which increases the surface area and volume for the reaction and maximizes the delivery of reactants to the subsurface and recovery of fluids from the subsurface. In some embodiments, SEHP and SCMEHP can increase permeability following fluid-rock interactions and also catalyze subsurface exothermic reactions (e.g., pyritization and decarbonation/serpentinization reactions), which provides additional heat to increase the kinetic rates of hydrogen generation, sulfur and carbon mineralization, and combinations and variations of these.

In some embodiments, maintaining the selected temperature or temperature range (e.g., 25° C. to 500° C.) can expedite the kinetic rates of the target reactions (e.g., serpentinization and decarbonation) and suppress follow-on reactions (e.g., Sabatier reactions) that would otherwise consume newly generated hydrogen. Targeted delivery of these treated fluids to specific lithologies, geologic structures (e.g., faults, folds), and other subsurface deformation features (e.g., existing and incipient fracture networks) further increases the volumes of hydrogen generation, drives the chemical reaction toward thermodynamic equilibrium, and maximizes the potential to control porosity and permeability.

SEHP utilizes dihydrogen sulfide as an injectate. FIG. 2 is a schematic illustration of sulfur enhanced hydrogen production 200 in a subsurface rock formation 205, according to an embodiment. The pyritization reactions use iron-rich mineral phases in mafic igneous subsurface rock formation 205 (e.g., olivine and pyroxene), as well as minor perovskite mineral phases, as a catalyst for sulfide reduction to pyrite mineral phases and the production of hydrogen ($H_2$) gas. An embodiment of SEHP 200 includes utilizing the process of injecting dihydrogen sulfide to react with the iron-rich olivine, orthopyroxene, perovskite, or other iron-rich mineral and iron-rich rock phases by also injecting heat and water from a source external into the geological system with an injection well 210 either before, during (mixed fluids), or after dihydrogen sulfide was injected into the geologic system. The hydrogen gas can be recovered from recovery well 215. Within the subsurface rock formation 205 the serpentinization reaction occurs in region 220 and pyritization reactions are shown in region 225. The reactions can occur in natural or induced fractures 230 throughout the subsurface formation 205.

SCMEHP utilizes various mixtures of dihydrogen sulfide and carbon dioxide as an injectate. FIG. 3 is a schematic illustration of sulfur-carbon mixture enhanced hydrogen production 300 in a subsurface formation 305, according to an embodiment. The pyritization and serpentinization/decarbonation reactions use the iron-rich mineral phases (e.g., olivine and pyroxene), as well as minor perovskite mineral phases, as a catalyst for sulfide reduction to pyrite mineral phases, carbon dioxide reduction to carbonate minerals, and the production of hydrogen ($H_2$) gas. The hydrogen gas can be recovered from recovery well 315. Within the subsurface rock formation 305 the serpentinization reaction occurs in region 320 and pyritization reactions are shown in region 325. Further, a $CO_2$ reduction to carbonate minerals occurs as shown in region 335. The reactions can occur in natural or induced fractures 330 throughout the subsurface formation 305. An embodiment of SCMEHP 300 includes utilizing the same process of injecting dihydrogen sulfide mixtures with carbon dioxide to react with the iron-rich olivine, orthopyroxene, perovskite, or other iron-rich mineral and iron-rich rock phases by also injecting heat from a source external into the geological system either before, during (mixed fluids), or after dihydrogen sulfide, carbon dioxide, or dihydrogen sulfide mixtures with carbon dioxide were injected into the geologic system through injection well 310.

The use of $CO_2$ from a steam methane reformer (SMR), an SMR combined with a carbon capture system (SMR+CCS), ammonia plant, coal-fired power plant, liming facilities, cement plant, steel mill, coking operations in preparation for steel manufacturing, geothermal plants, hydrothermal plants, refineries, sewage treatment plants, landfills, natural gas power plants, chemical plants, natural processing or separation plants, renewable natural gas facilities, renewable natural gas combustion, autothermal reforming facility, flaring of sewage treatment gas, flaring of landfill gas, biodiesel facilities, or direct air capture facility can be used to enhance hydrogen production via various forms of subsurface hydrogen generations and the use of carbon mineralization with subsurface hydrogen generation to reduce the $CO_2$ emissions of these processes. For example, as shown below in Table 2, $CO_2$ may be utilized to generate oxides and water in the subsurface formation while sequestering carbon from carbon dioxide in a decarbonation reaction.

Figure 4:
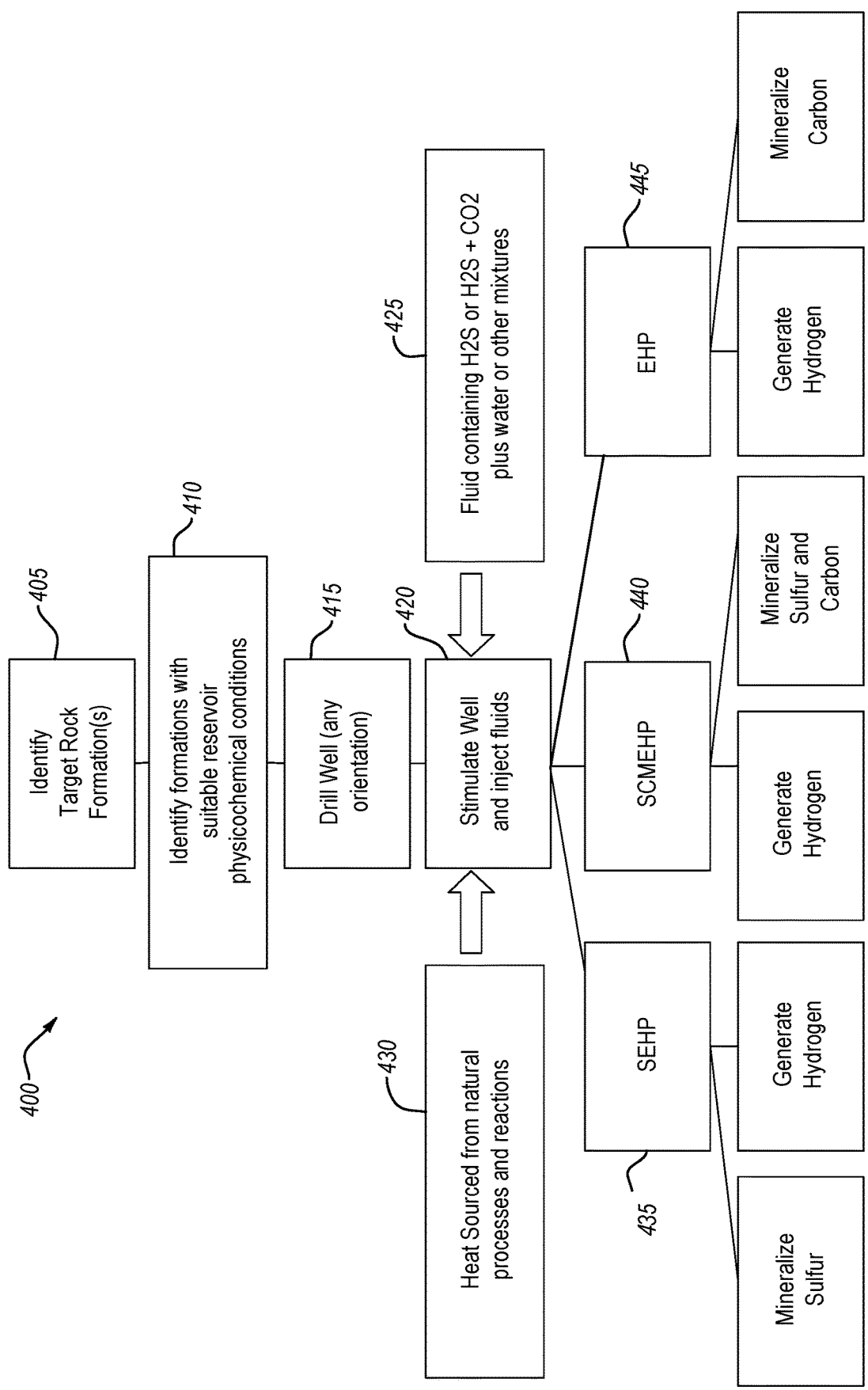
FIG. 4 is a flow chart of methods for performing sulfur enhanced hydrogen production and sulfur-carbon mixture enhanced hydrogen production, and enhanced hydrogen production according to an embodiment.

The heat, $H_2S$, $CO_2$, or water may be a waste or product of the topside facility, or the topside facility may utilize waste heat emitted by the exothermic nature of the subsurface reactions. In some examples, the facility can be configured to produce a fluid or heat as the byproduct. In some examples, a system for producing hydrogen can include a heat exchanger configured to heat the fluid to between about 25° C. and about 500° C. and a pump configured to pump the fluid into a subsurface formation. A recovery well can be fluidly connected to the subsurface formation and configured to remove at least one of a hydrogen gas or a heated fluid from the subsurface formation FIG. 4 is a flow chart of a method 400 for performing sulfur enhanced hydrogen production, sulfur-carbon mixture enhanced hydrogen production, and enhanced energy production, according to an embodiment. As shown, act 405 can include identifying target rock formations. The target rock formation may be evaluated in act 410 for rock/mineral types and a thermal fluid and/or reactant (e.g., dihydrogen sulfide, water, carbon dioxide) may be formulated according to the rock/mineral types in the target rock formation. As shown in act 415, a well may be drilled or an existing well used to deliver the stimulation fluid to the target rock formation. The rock/minerals in the rock formation may be stimulated in act 420 by injecting heated stimulation fluid into the well as shown in act 425 or by injecting heat into the well prior to, during, or after the injection of stimulation fluid. The heat for the heated stimulation fluid may be provided by equipment located on the surface (e.g., topside) or in the well. The heat is provided, at least in part, by sources external to the geological formation. In some embodiments, as shown in act 430, the heat can be sourced from natural processes and reactions.

Depending upon the composition of the fluid injected into the subsurface rock formation, one or more of SEHP, SCMEHP, and EHP is carried out in situ in the target rock formation. As shown in act 435, SEHP generates hydrogen and mineralizes sulfur in the rock formation. As shown in act 440, SCMEHP generates hydrogen and mineralizes both sulfur from dihydrogen sulfide and carbon from carbon dioxide in the rock formation. As shown in act 445, EHP generates hydrogen and mineralizes carbon in the rock formation. Accordingly, hydrogen is produced and one or more of sulfur, carbon, or other injectates may be sequestered.

SEHP, SCMEHP, and EHP utilize one or more of serpentinization reactions, decarbonation reactions, or pyritization reactions to produce hydrogen from the rock in the subsurface formation and in some cases to sequester carbon (e.g., from carbon dioxide) or sulfur (e.g., from dihydrogen sulfide) within the surface formation. Table 1 below shows the chemistry of serpentinization reactions in various minerals. Table 2 below shows the chemistry of decarbonation reactions in various minerals. Table 3 below shows the chemistry of pyritization reactions with various metal species.

TABLE 1

Serpentinization Reactions

| Mineral | Mineral Phase | Reaction | Moles of Igneous Mtrls | Moles of $H_2$ Generated |
|---|---|---|---|---|
| Olivine | Fayalite | $3Fe_2SiO_4 + 2H_2O \xrightarrow{yields} 2Fe_3O_4 + 3SiO_2 + 2H_2$ | 3 | 2 |
| Pyroxene | Ferrosilite | $3Fe_2Si_2O_6 + 2H_2O \xrightarrow{yields} 2Fe_3O_4 + 6SiO_2 + 2H_2$ | 3 | 2 |

TABLE 2

Decarbonation Reactions

| Mineral | Mineral Phase | Reaction | Moles of Igneous Mtrls | Moles of $CO_2$ Sequestered |
|---|---|---|---|---|
| Olivine | Forsterite | $Mg_2SiO_4 + 2CO_2 \xrightarrow{yields} 2MgCO_3 + SiO_2$ | 1 | 2 |
| Pyroxene | Enstatite | $Mg_2Si_2O_6 + 2CO_2 \xrightarrow{yields} 2Mg_3CO_3 + 2SiO_2$ | 1 | 2 |
| Plagioclase | Anorthite | $CaAl_2Si_2O_8 + 2H_2O \xrightarrow{yields} Ca_3CO_3 + Al_2Si_2O_5(OH)_4$ | 1 | 1 |
| Serpentine | Anorthite | $Mg_3Si_2O_5(OH)_4 + 3CO_2 \xrightarrow{yields} 3Mg_3CO_3 + 2SiO_2 + 2H_2O$ | 1 | 3 |
| Brucite | Enstatite | $Mg(OH)_2 + CO_2 \xrightarrow{yields} MgCO_3 + 2H_2O$ | 1 | 1 |

TABLE 3

Pyritization Reactions

| Reaction | Moles of Iron (II) Reacted | Moles of $H_2$ Generated | Moles of $H_2S$ Sequestered |
|---|---|---|---|
| $FeS + H_2S \xrightarrow{yields} FeS_2 + H_2$ | 1 | 1 | 1 |
| $Fe^{2+} + 2H_2S \xrightarrow{yields} FeS_2 + H_2 + 2H^+$ | 1 | 1 | 2 |
| $Cu^+ + Fe^{2+} + 2H_2S \xrightarrow{yields} CuFeS_2 + 0.5H_2 + 3H^+$ | 1 | 0.5 | 2 |

In embodiments, as shown in Table 3, the pyritization reactions can independently produce hydrogen when dihydrogen sulfide gas or supercritical dihydrogen sulfide is injected into porous, faulted, or geologically or incipiently fractured subsurface formation, depending on the mineralogy, pore size, fracture intensity, pore fluid composition, and purity of gas injectate. The pyritization can result in recovery of hydrogen and the potential to sequester, by mineralization, sulfur, carbon, or sulfur and carbon dioxide.

In some examples, a temperature range for the pyritization and decarbonation/serpentinization reactions can be between about 25° C. to about 500° C. It being understood that the temperature can be greater than about 100° C., greater than about 120° C., greater than about 150° C., less than about 500° C., less than about 400° C., from about 90° C. to about 500° C., from about 150° C. to about 250° C., and all temperatures with these values as well as higher and lower temperatures. As such, the fluid can be heated prior to injection in the subsurface formation.

As shown in Table 1 and Table 2, serpentinization and decarbonation reactions can generate hydrogen and mineralize $CO_2$. Kinetics of the pyritization reaction improve until about 300° C., when Sabatier reactions can start to consume the generated hydrogen by reforming with $CO_2$ or dissolved inorganic carbon to produce abiogenic methane or other species if there is sufficient carbon dioxide fugacity in the pore fluid system. A substantial amount of heat can be generated in the reaction and hydrogen formation process. In some examples, at least 7 kWh of heat can be produced for every ton of $CO_2$ that is mineralized. Major parasitic energy loss in the system is used to grind, mill, or comminute the iron-rich rock to the required particle sizes optimal for the reaction and heat up the iron-rich rock, $CO_2$, and water feedstocks that are injected into the furnace. Parasitic losses likely account for less than about 10% of the heat generated by the reaction. A significant amount of waste heat can thus be generated by the process, given a sufficiently high reaction temperature, which may be utilized in several ways as shown in this disclosure.

The temperatures can be maintained by extracting heated fluid, including reaction product, from the subsurface formation, the heat of the fluid injected into the subsurface formation, and the exothermic heat released by mineralization. A factor, among many, in determining and configuring the application of SEHP and SCMEHP techniques, such as in subsurface rock formations, is the limitation of the porosity and fracture network in many subsurface formations Preferably, these factors should be understood and addressed in evaluating a subsurface resource, and in applying a system and method for recovering a resource (e.g., hydrogen) from a subsurface reservoir.

In some examples, gaseous dihydrogen sulfide ($H_2S$) or $H_2S$ dissolved in or combined with the fluid is injected into subsurface formations. The presence of $H_2S$ itself must often be abated and can lead to significant economic and environmental issues with operating traditional geothermal systems, while similar challenges can be anticipated by other means of hydrogen production. The $H_2S$ can be injected directly or co-injected with specifically treated fluid to increase the kinetics and yields of pyritization reactions that produce $H_2$ directly. The injected $H_2S$ increases the kinetics and yields of chemical alteration of the subsurface formation which increases surface area and rock volumes for ongoing reactions during subsequent phases of SEHP.

In general, the further enhancement of SEHP can be provided by additional $H_2S$ waste streams from geothermal powerplants, industrial waste streams. The $H_2S$ waste streams can also be applied to natural geothermal or heat-assisted systems. Heat assisted systems could supplement geothermal heating of the underlying subsurface formation and considerably broaden application of SEHP or the top-side steam-assisted methods of producing hydrogen. $H_2S$ from an SMR, SMR+CCS, coal-fired power plant, geothermal plants, hydrothermal plants, refineries, sewage treatment plants, landfills, natural gas power plants, natural processing or separation plants, sour gas natural gas fields, wastewater disposal, water-rock interactions following fluid injection, for example, gas evolved from "souring" of oil or gas fields following fluid injection, renewable natural gas facilities, renewable natural gas combustion, biodiesel facilities, or direct air capture facility can increase hydrogen production via various forms of subsurface hydrogen generations and the use of sulfur mineralization in association with subsurface hydrogen generation to reduce sulfur emissions.

Figure 5:
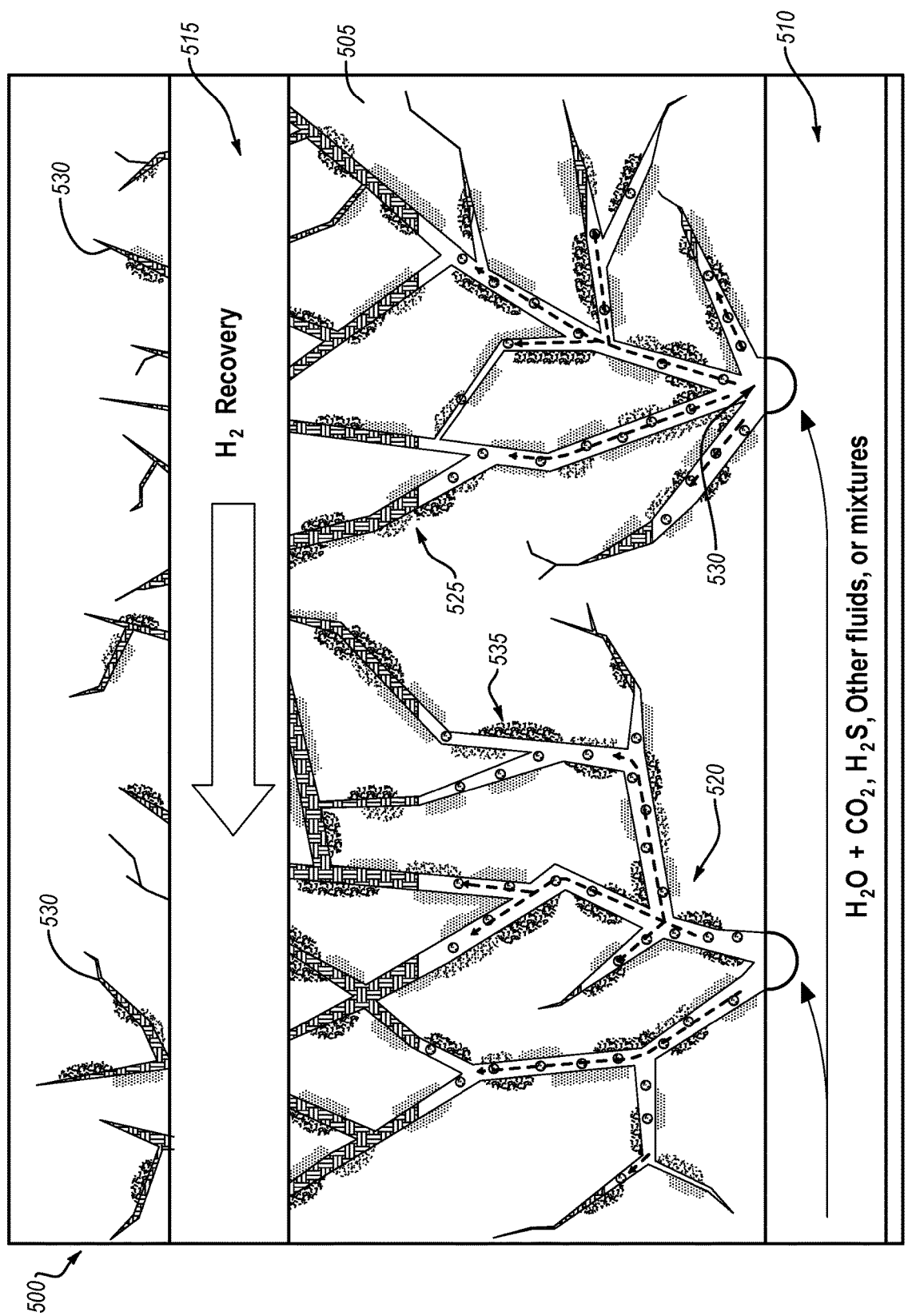
FIG. 5 is a schematic illustration of heat-assisted enhanced hydrogen production with embodiments of carbon or sulfur sequestration in a subsurface formation, according to an embodiment.

FIG. 5 is an illustration showing EHP 500 with carbon or sulfur sequestration in a subsurface formation, according to an embodiment. EHP 500 includes injecting fluid with gaseous or super-critical $CO_2$ or $CO_2$ dissolved in or combined with specifically treated or heated fluids, $H_2S$ or other fluids or mixtures of gaseous or super-critical $H_2S$, or $H_2S$ dissolved in or combined with specifically treated fluids through an injection well 510 into a porous, permeable, faulted, or geologically or incipiently fractured subsurface formation 505 with sufficient ambient geothermal conditions (e.g., temperature greater than 35° C.), using heat sources external to the geological system. The hydrogen gas can be recovered from recovery well 515. Within the subsurface rock formation 505 the serpentinization reaction occurs in region 520 and pyritization reactions are shown in region 525. Further, a $CO_2$ reduction to carbonate minerals occurs as shown in region 535. The reactions can occur in natural or induced fractures 530 throughout the subsurface formation 505.

In some embodiments, $CO_2$ and/or $H_2S$ co-produced with steam, natural hydrogen, or a mixture of other gases from topside sources can be treated and temperature controlled before being injected directly or co-injected with specifically treated fluids. EHP 500 can encourage hydrogen formation by injecting various forms of heated water to proliferate the serpentinization reactions. For example, hydrogen formation can be encouraged by injecting heated fluids before, during, or following carbon dioxide injection to stimulate serpentinization and decarbonation reactions and/or injecting $H_2S$ and other fluids to catalyze the pyritization reaction described above in reference to FIG. 2 and FIG. 3 (e.g., SEHP and/or SCMEHP). These embodiments can produce low-carbon $H_2$ directly and sequester carbon and sulfur. Notably, EHP 500 can also be applied to heat-assisted production systems in geological settings that do not benefit from naturally elevated geothermal conditions/gradients. For example, by using a variety of sources of heat and/or waste heat, EHP 500 can deliver key reactants (i.e., heat, water, carbon dioxide, and dihydrogen sulfide) to geological formations with abundant reduced iron reactants but deficient in those key reactants to produce hydrogen, carbonate minerals, and sulfide minerals as products. Thus, EHP 500 benefits from both natural and anthropogenic sources of $CO_2$ and $H_2S$, the latter including those associated with other forms of fossil energy, other means of energy generation, and other means of hydrogen production. Accordingly, one or more of the key reactants may be provided from sources outside of the geological formation (e.g., subsurface reservoir).

The embodiments herein provide an important low-carbon or negative-carbon and negative-sulfur production pathways for hydrogen that utilize injectate fluids heated from sources external to the geological system and rely on the serpentinization/decarbonation and pyritization reactions described in Tables 1-3 above.

The methods and system disclosed herein significantly increases the geological/geographical breadth of enhanced hydrogen production applications to geological systems with the right set of reactant minerals (e.g., olivine, orthopyroxene, ilmenite, siderite, hematite, actinolite bearing rocks), without excess thermal energy (e.g., no geothermal heat, no areas without excess geothermal gradients (e.g., less than 35° C.), or other key reactants (e.g., water, dihydrogen sulfide, carbon dioxide). Thus, integration of external inputs into EHP greatly improves recovery of low-carbon hydrogen and potential to sequester (by mineralization) carbon and/or sulfur from natural (e.g., geothermal systems) or anthropogenic sources.

A preferred temperature range for the decarbonation, serpentinization, and pyritization reactions embodied in EHP is between about 25° C. to about 500° C. The temperature can be greater than about 100° C., greater than about 120° C., greater than about 150° C., less than about 500° C., less than about 400° C., from about 90° C. to about 500° C., from about 150° C. to about 250° C., and all temperatures with these values and as well as higher and lower temperatures. The selected temperature can be achieved with topside integration of heated fluids using heat from sources external to the geological setting. The fluid that is injected is heated, cooled, or otherwise temperature controlled to match the range of selected temperatures, or specific temperatures in the case of some specific reservoirs, into subsurface rock formations to reach and maintain the selected reaction temperature and expedite the kinetic rates and yields of the target reactions (e.g., serpentinization, decarbonation, pyritization) as well as suppress undesired follow-on reactions (e.g., Sabatier reactions) that would otherwise consume newly generated hydrogen and form abiogenic methane or other species. While some heat may be lost through conduction into the surrounding rock, over time, the rock closest to the reaction zone will increase in temperature towards the selected temperature or range, allowing fluid-rock reactions of decarbonation, serpentinization, and/or pyritization to occur and to occur at higher kinetic rates capable of more closely approximating thermodynamic equilibrium. Further, the exothermic nature of the reactions will increase or maintain the ongoing production of heat and hence modulate the temperature in the target formation.

In general, embodiments disclosed herein provide for the further stimulus of EHP by utilizing additional $CO_2$ and $H_2S$ waste streams from sources including geothermal power plants, fossil fuel-fired power plants, industrial waste streams (e.g., refineries, gas separation systems, ethanol plants, steel mills, liming operations, cement factories, waste incinerators, landfills, metallurgy plants, coking facilities, sewage treatment facilities, pulp and paper manufacturing), gas processing exhaust or rejectate, processed natural gas, other low BTU natural gas reservoirs, or the like. EHP can be applied to natural geothermal or geological systems that contain the subsurface formations but require heat-assist or other key reactants (e.g., water, $CO_2$, $H_2S$). The latter could supplement geothermal heating of the subsurface formation and broaden the application of EHP.

Figure 6:
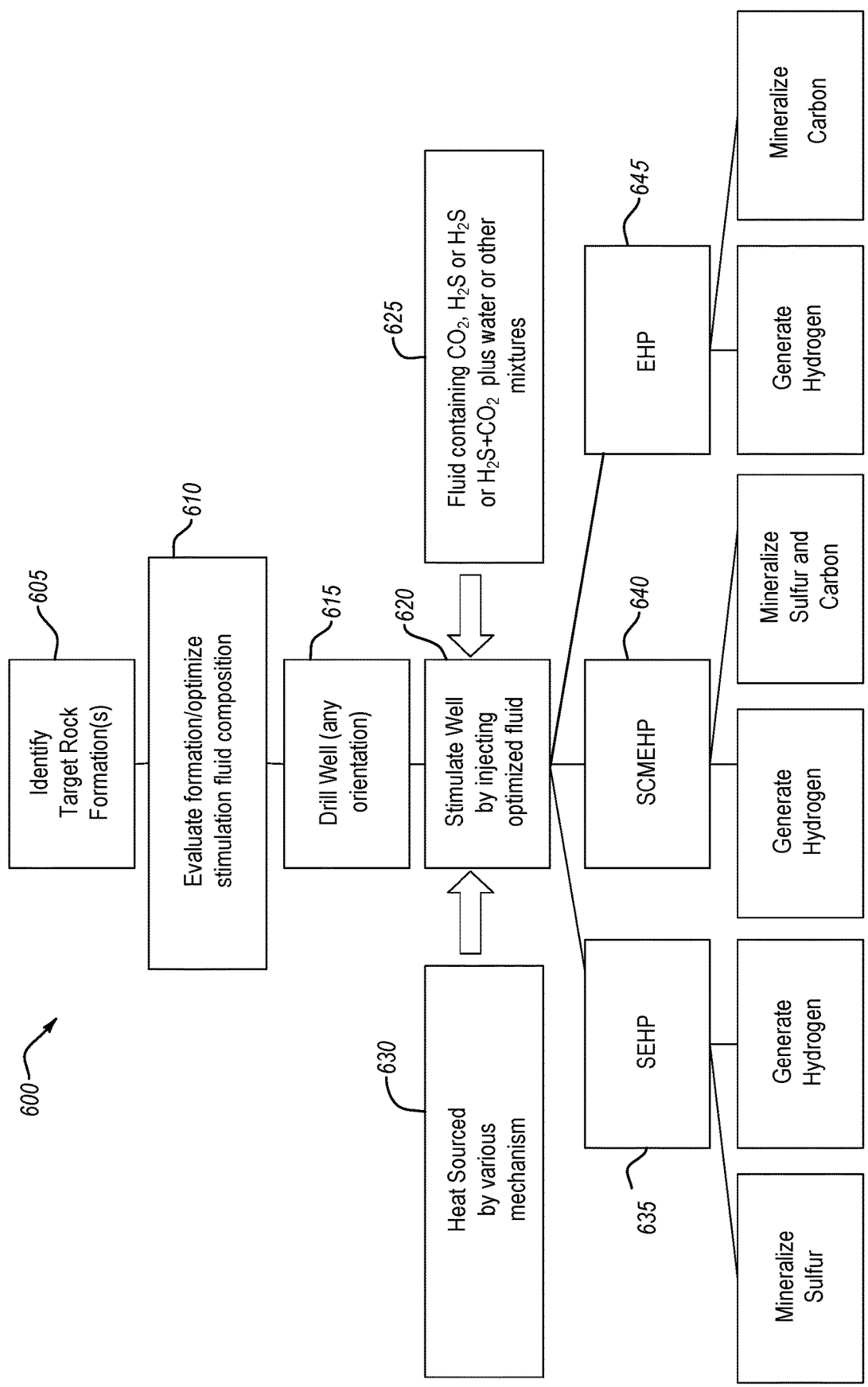
FIG. 6 is a flow chart of methods for a top-side workflow for heat-assisted enhanced hydrogen production, sulfur enhanced hydrogen production, and sulfur-carbon mixture enhanced hydrogen production, according to an embodiment.

FIG. 6 is a flow chart of a method 600 for performing EHP, according to an embodiment. As shown in act 605, target rock formations may be identified. The target rock formation may be evaluated for rock/mineral types and a stimulation fluid (e.g., temperature, heated water, carbon dioxide, dihydrogen sulfide) may be formulated according to the rock/mineral types in the target rock formation, as shown in act 610. In act 615, a well may be drilled or an existing well may be used to deliver the stimulation fluid to the target rock formation. In act 620, the rock/minerals in the subsurface formation may be stimulated by injecting heated stimulation fluid into target geologic formations in the well. The heat for the heated stimulation fluid may be provided by equipment located on the surface (e.g., topside) or at depth in the well. The heat is provided, at least in part, as shown in acts 625 and 630, by sources external to the geological formation. Depending upon the composition of the fluid injected into the subsurface rock formation, EHP can be carried out in situ in the target rock formation. EHP generates hydrogen and is capable of mineralizing carbon and sulfur in the rock formation. Accordingly, hydrogen is produced and carbon, sulfur, or other injectates may be sequestered.

Depending upon the composition of the fluid injected into the subsurface rock formation, one or more of SEHP, EHP, or SCMEHP is carried out in situ in the target rock formation. As shown in act 635, SEHP generates hydrogen and mineralizes sulfur in the rock formation. As shown in act 640, SCMEHP generates hydrogen and mineralizes both sulfur from dihydrogen sulfide and carbon from carbon dioxide in the rock formation. As shown in act 645, EHP generates hydrogen and mineralizes carbon in the rock formation. Accordingly, hydrogen is produced and one or more of sulfur, carbon, or other injectates may be sequestered.

The benefits of EHP or heat-assisted forms of SEHP or SCMEHP compared to other forms of enhanced hydrogen production include increased kinetics, increased yield of hydrogen, and increased sequestration of carbon from the serpentinization and decarbonation reactions compared to non-heat assisted forms of the same. Fluid flow, both of injected fluids into the system and hydrogen out of the system, operates via hydraulic conductivity. Hydraulic conductivity and specifically the flux of fluids into or out of the target system vary as a function of the porosity and permeability, where the latter generally increases proportionally to the former. A factor, among many, in determining and configuring the application of EHP is the limitation of the porosity and fracture network in many subsurface formations.

For example, more carbon dioxide or dihydrogen sulfide in the injectate fluid may be utilized in certain rock formations depending upon the rock type, porosities, and permeabilities than in other rock formations with different rock types, porosity, or permeability. In an example, a well or a series of injector/producer wells can be drilled into a subsurface formation in heat-assisted subsurface systems and optionally natural geothermal subsurface systems. The injection of heated fluid containing $CO_2$ or $H_2S$ into the well (and rock formation) can be carried out using any of the fluids discussed herein. The fluid including one or more of specifically treated or heated steam, water, hot water, brine, pressurized hot water, gray water, wastewater, seawater, geothermal fluids, geothermal exhaust fluids, or other heated thermal (e.g., waste heat) fluids could be heated up at pressure, to the form of high-pressure steam or high-pressure, high-temperature fluids, held at temperatures between about 25° C. to about 500° C., and mixed with a supply of $CO_2$ and/or $H_2S$ may be injected into the subsurface formation to carry out the EHP.

Figure 7:
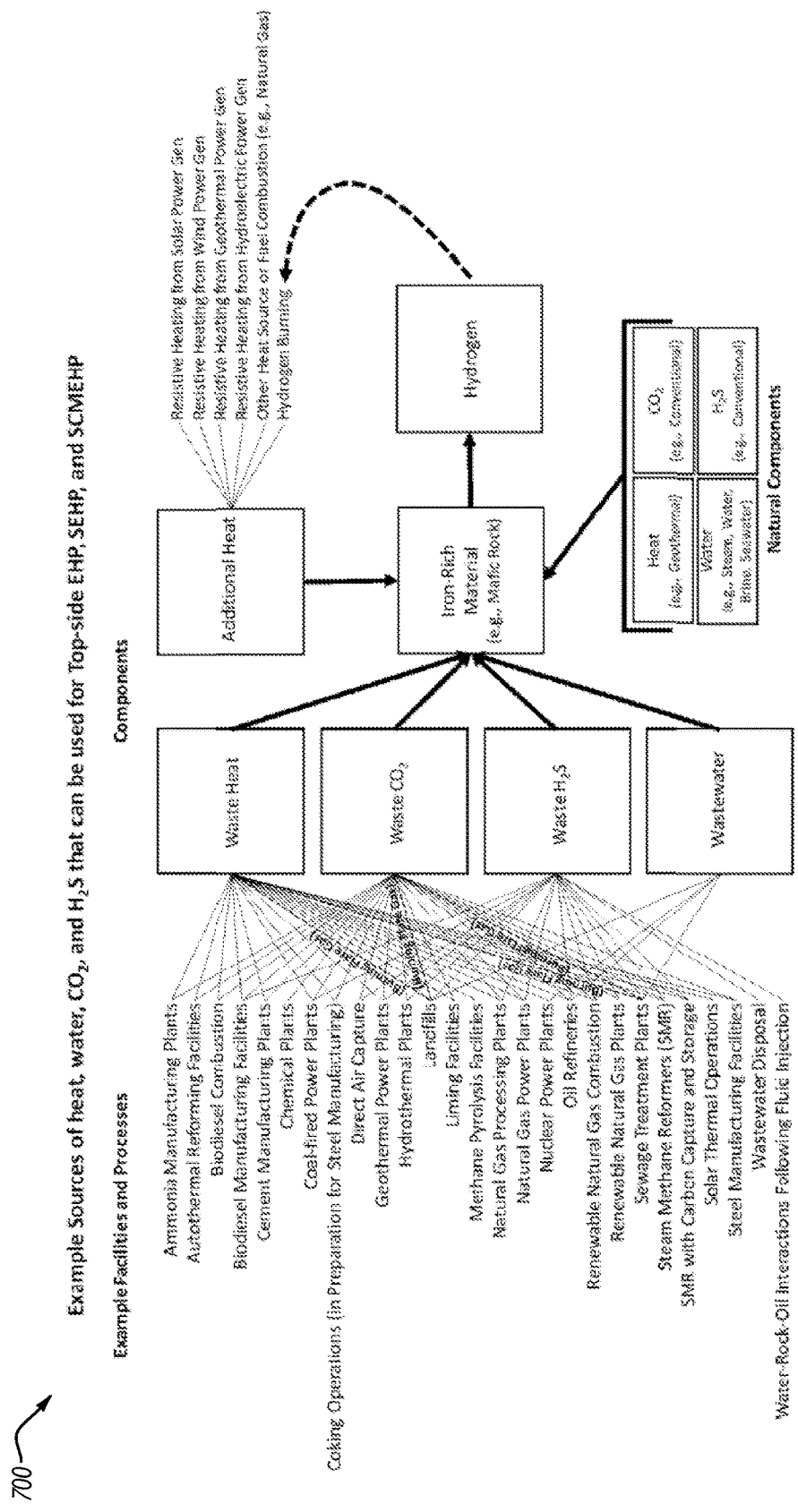
FIG. 7 is a schematic illustration of example sources of heat, water, carbon dioxide, and hydrogen sulfide that can be used for heat-assisted enhanced hydrogen production, sulfur enhanced hydrogen production, and sulfur-carbon mixture enhanced hydrogen production, according to an embodiment.

FIG. 7 illustrates a list 700 of example sources of waste heat, water, $CO_2$, and $H_2S$, for use in EHP, SEHP, and SCMEHP, according to an embodiment. The integration of waste heat and/or steam from SMR, SMR+CCS, ammonia plants, coal-fired power plants, natural-gas power plants, liming facilities, methane pyrolysis facilities, autothermal reforming facilities, nuclear powerplants, solar thermal operations, steel manufacturing, coking operations in preparation for steel manufacturing, geothermal waste, oil refineries, sewage treatment facilities, flaring of sewage treatment gas, flaring of landfill gas, natural gas processing centers, combustion of renewable natural gas, biodiesel manufacturing, biodiesel combustion, resistive heating from solar power generation, resistive heating from wind power generation, resistive heating from geothermal power generation, or resistive heating from hydroelectric power generation, processes can increase the output and broaden the applicability of various forms of subsurface hydrogen generation and carbon and/or sulfur mineralization. This heat and/or waste heat is widely available through a diverse set of integrations of topside facilities which may provide for significantly enhanced economics.

The waste heat and $CO_2$ and/or $H_2S$ can be integrated with subsurface or surface hydrogen generation. Waste heat, steam, hot water, or other forms of thermal fluids from an SMR process can provide downhole heating in subsurface hydrogen generation application. $CO_2$ or $H_2S$ from an SMR/SMR+CCS facility would be injected downhole and mineralized in the subsurface formation, further enhancing subsurface and surface hydrogen generation.

Hydrogen produced via SMR/SMR+CCS and hydrogen produced via various forms of surface and subsurface hydrogen generation may be combined and processed in a larger facility to improve economic scale. Testing can be conducted in real time or on a sample basis to confirm the ratio of hydrogen produced via SMR/SMR+CCS and various forms of surface and subsurface hydrogen generation for downstream customers. In an SMR/SMR+CCS facility, process $CO_2$, $H_2S$, or heat that comes out of the water gas shift reactor can be relatively low cost and simple to capture. $CO_2$ that comes out of the flue gas from the SMR furnace is much more expensive to capture and accounts for about 33% of the emitted $CO_2$. A slip stream of hydrogen from electrochemical hydrogen purification can be utilized as fuel for the SMR furnace to eliminate $CO_2$ from that portion of the SMR process.

Similarly, autothermal reforming (ATR) and CCS waste heat and $CO_2$ can be integrated into any form of subsurface or surface hydrogen generation. ATR produces a similar waste heat stream along with a highly purifiable $CO_2$ stream. ATR is an equal if not better solution than SMR for producing low carbon hydrogen, and ATR produces a similar waste heat stream along with a highly purifiable $CO_2$ stream compared to SMR.

In some embodiments, subsurface or surface hydrogen generation can be directly integrated into an energy system. For example, a slip stream of hydrogen produced via various forms of subsurface or surface hydrogen generation can be burned to generate heat for controlling the temperature of a subsurface formation, such as by heating gases or liquids prior to injection into the subsurface formation by hydrogen combustion. Burning of hydrogen can reduce the net hydrogen production, but results in zero-carbon heat production for controlling iron-rich rock temperatures. In some embodiments, onsite heat can be provided by one or more of natural gas, certified natural gas, landfill gas, renewable natural gas, ammonia, any other standard, low carbon fuel, or other forms of heat such as SMR, SMR+CCS, ammonia plants, coal-fired power plants, natural-gas power plants, liming facilities, methane pyrolysis facilities, autothermal reforming facilities, nuclear power plants, solar thermal operations, steel manufacturing, coking operations in preparation for steel manufacturing, geothermal waste, oil refineries, sewage treatment facilities, flaring of sewage treatment gas, flaring of landfill gas, natural gas processing centers, combustion of renewable natural gas, biodiesel manufacturing, biodiesel combustion, resistive heating from solar power generation, resistive heating from wind power generation, resistive heating from geothermal power generation, resistive heating from hydroelectric power generation, waste heat from methanation facilities, waste heat from synthetic fuel production facilities, waste heat from fuel cells, or the like.

In some embodiments, hydrogen produced in subsurface and/or surface hydrogen generation can be burned in a gas turbine to produce power and the waste heat could then be directed toward or otherwise utilized for temperature control of the subsurface formation or other surface processes. In some examples, the burning of hydrogen can be done via simple cycle gas turbines, combined cycle systems, high temperature fuel cells, or the like. Waste heat generated by the exothermic nature of the serpentinization or pyritization reactions can also then be directed toward or otherwise utilized for temperature control.

In some embodiments, natural gas power production can be integrated with subsurface and/or surface hydrogen generation. $CO_2$ can be captured from a natural gas power plant and injected into subsurface or surface hydrogen generation for carbon or sulfur mineralization, or both. In addition, waste heat from the power plant can be utilized for temperature control. Excess waste heat recovered from the exothermal nature of serpentinization or pyritization can also be cycled and utilized topside. A portion or a full amount of hydrogen produced from the various forms of subsurface or surface hydrogen generation well can be blended into the natural gas fuel that is being burned by the power plant.

In some embodiments, natural gas power production can be integrated with subsurface and/or surface hydrogen generation. This can also be done using coal, pet coke, diesel, or other fuels, where the boiler and/or turbine is co-fired with hydrogen from subsurface or surface hydrogen generation. The $CO_2$, $H_2S$, or both produced in the process can be captured and sequestered via mineralization in the wells or rock outputs from subsurface or surface hydrogen generation.

In some embodiments, subsurface and/or surface hydrogen generation can be integrated with ammonia production. Ammonia plants can utilize the SMR process paired with a Haber-Bosch process back end, which can generate considerable waste heat and $CO_2$. Waste heat can be utilized to produce hot downhole temperatures for various forms of subsurface or surface hydrogen generation while the $CO_2$ can be mineralized into the iron-rich rock, mafic igneous rock, metamorphosed or hydrothermally altered mafic igneous rock, olivine- or pyroxene-bearing igneous, metamorphic, or sedimentary rock or sediment, metamorphosed or hydrothermally altered olivine- or pyroxene-bearing igneous, metamorphic, or sedimentary rock or sediment, serpentine mineral bearing rock or sediment, partially or completely serpentinized rock, serpentinite, pyrite, iron-rich sandstone, other iron-rich sedimentary rock, or iron-rich sediments. The hydrogen produced via subsurface or surface hydrogen generation can be utilized to supplement hydrogen produced from the SMR or to increase the capacity of the ammonia plant (e.g., Haber-Bosch reactor or plant).

In some embodiments, subsurface and/or surface hydrogen generation can be integrated with steel and/or coking plants. Steel and coking plants produce significant $CO_2$ and heat via the reduction process in furnaces. In steel production, hydrogen can be utilized as a reductant. Integrating a steel or coking plant with surface and subsurface hydrogen production facilities can enable the $CO_2$ or $H_2S$ from the plant to be mineralized downhole, waste heat from the plant to be used for controlling downhole temperature, and hydrogen from various forms of surface and subsurface hydrogen production facilities for use as a reductant in the coking or steel making furnaces.

In some embodiments, subsurface or surface hydrogen generation can be integrated with chemical plants. Any chemical plant with $CO_2$ or $H_2S$ and waste heat produced could be integrated with various forms of subsurface hydrogen production to produce a hydrogen stream, which could either be partially or fully utilized by a refinery, other chemical plant, or prepared for external sale. In some embodiments, subsurface or surface hydrogen generation can be integrated with natural gas plants. Natural gas processing plants typically separate $CO_2$ or $H_2S$ from other natural gas processes, vent the $CO_2$ or $H_2S$, and potentially heat, and send natural gas towards customers through pipelines. Surface or subsurface hydrogen generation operations can be located at or near a natural gas processing facility where the $CO_2$ or $H_2S$ (or heat) from the natural gas processing plant can be injected downhole or utilized in surface operations and the hydrogen from the various forms of surface or subsurface hydrogen generation systems could be injected and blended into the natural gas at the pipeline.

In some embodiments, subsurface and/or surface hydrogen generation can be integrated with electrolysis plants. Electrolysis plants utilize renewable electricity and water to produce hydrogen. An electrolysis plant also produces waste heat. The waste heat from an electrolyzer can be utilized for the control of bottomhole or facility temperatures in various forms of surface or subsurface hydrogen generation facilities, and the hydrogen from various forms of surface or subsurface hydrogen generation can be blended with hydrogen from the electrolyzer to increase scale of production or produce heat for downhole heating.

In some embodiments, subsurface and/or surface hydrogen generation can be integrated with hydrogen liquification plants. Hydrogen from various forms of surface or subsurface hydrogen generation facilities can be liquified for transport. Liquification requires significant thermal and electric energy and produces waste heat in the process. Waste heat from the liquification plant can be utilized to increase downhole temperatures in various forms of surface or subsurface hydrogen generation. Also, $CO_2$ or $H_2S$ produced via any combustion-related energy generation to fuel the liquefication plant can be captured and utilized or sequestered via surface and/or subsurface hydrogen generation processes.

In some embodiments, subsurface and/or surface hydrogen generation can be integrated with a direct air capture (DAC) system. Direct Air Capture of $CO_2$ or $H_2S$ utilizes considerable electricity and/or thermal energy and results in a stream of pure $CO_2$ or $H_2S$ as well as waste heat. A DAC system can be placed directly adjacent to various forms of surface or subsurface hydrogen generation facilities where the waste heat from the DAC system may be used to control downhole temperature in a well or geological formation. Additionally, the $CO_2$ or $H_2S$ from the DAC system may be injected and stored in the subsurface or mineralized downhole. Some or all hydrogen produced from various forms of surface or subsurface hydrogen generation can be utilized to provide process heat and/or power for the DAC system. Additionally, surplus $CO_2$ from the DAC system can be combined with generated hydrogen to produce syngas, synthetic diesel, synthetic aviation fuel, synthetic gasoline, methanol, or other syngas-derived plastics and products.

Likewise, waste or surplus heat from fuel or chemical production systems and processes can be integrated with subsurface hydrogen production, carbon sequestration, or sulfur sequestration. For example, waste heat from production of syngas, synthetic diesel, synthetic aviation fuel, synthetic natural gas, synthetic gasoline, synthetic methanol, syngas-derived plastics, or other syngas derived products may be integrated or otherwise utilized to control the temperature of subsurface rock formation or one or more reactants injected therein.

In some embodiments, subsurface and/or surface hydrogen generation, such as EHP or any of the techniques disclosed herein, can be integrated with data centers. Data centers are widely known to have high power demands, mostly due to cooling requirements for servers. Integrating various forms of surface or subsurface hydrogen generation facilities with a data center allows the heat from the data center to be removed and utilized to control temperatures in wells, geological formations, or surface operations of various forms of surface or subsurface hydrogen generation facilities. Hydrogen produced by surface or subsurface hydrogen generation facilities can then be utilized to produce power via a gas turbine or fuel cell for the data center. Waste heat from such power production can also be added back downhole or utilized to operate chillers. Hydrogen could also be directly fired to operate chillers, heat pumps, or other equipment that could remove heat from data centers.

Integration of the EHP, SEHP, or SCMEHP with topside facilities or processes may be accomplished using conduits (e.g., pipes, hoses, lines), heat exchangers, plumbing, or other equipment for fluidly or thermally connecting one system to another system.

Figure 8:
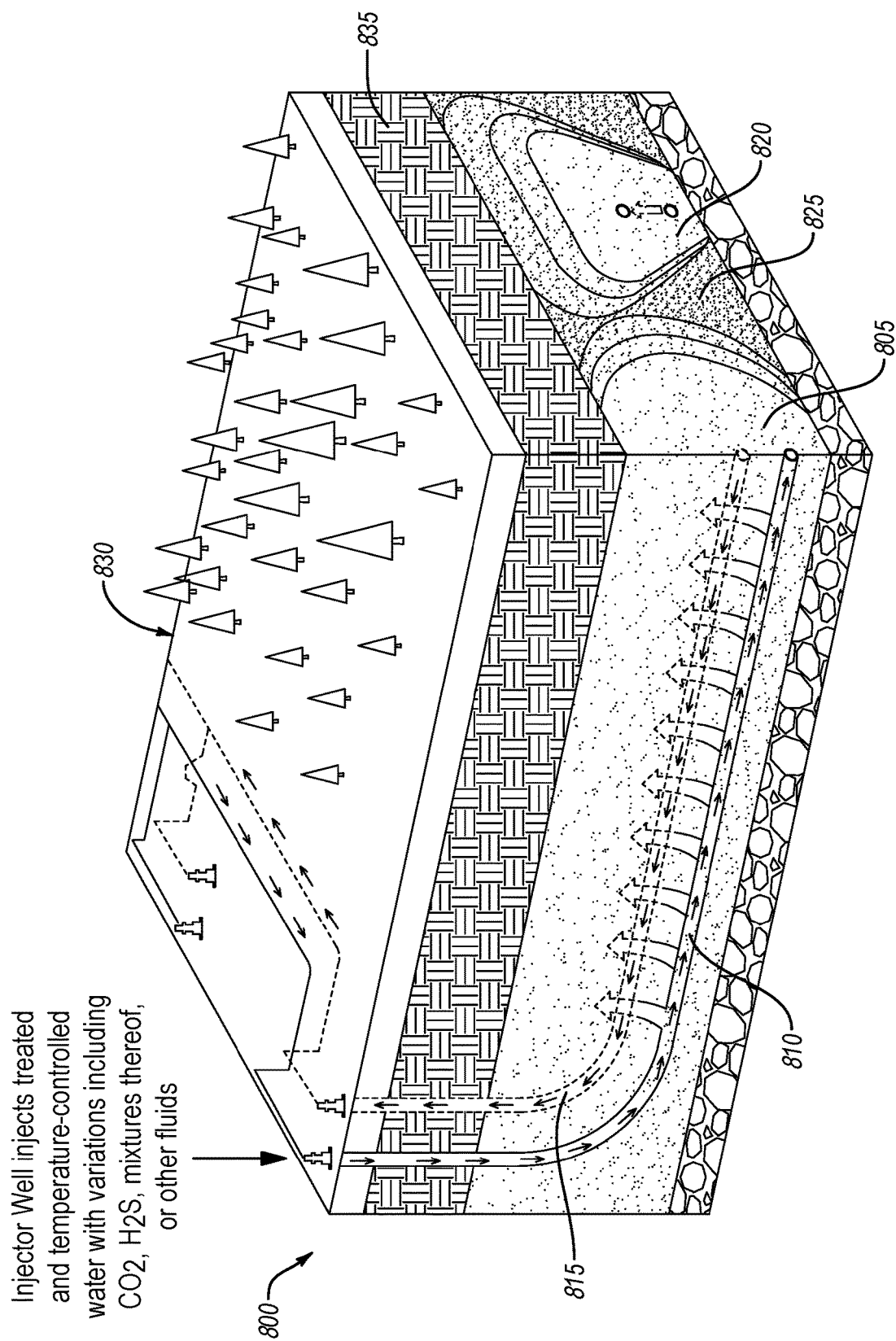
FIG. 8 is a schematic illustration of enhanced hydrogen production, heat-assisted enhanced hydrogen production, sulfur enhanced hydrogen production, and sulfur-carbon mixture enhanced hydrogen production in a subsurface formation, according to an embodiment.

FIG. 8 is an example of an EHP process 800, according to an embodiment. The fluid composition(s) can be injected directly into a geological formation via the injector/injection well. Hydrogen gas formed in the subsurface formation may be collected in the injector well or in a separate hydrogen producer or recovery well. The well extends into the subsurface formation 805. The dihydrogen sulfide may be mineralized in the rock. Gaseous, dissolved, or super-critical carbon dioxide or dihydrogen sulfide can be injected directly into a geological formation via the injector/injection well 810. The fluid injected into the injector well 810 may be temperature controlled (e.g., heated). Hydrogen gas formed in the subsurface formation may be collected in the injector well or in a separate hydrogen producer or recovery well 815. After the collection of hydrogen gas, it can be stored or mixed with other gases (e.g., methane) for stable transportation and/or use.

In some embodiments, EHP may include injecting specifically treated or heated steam, water, hot water, brine, pressurized hot water, gray water, wastewater, seawater, geothermal fluids, geothermal exhaust fluids, other heated thermal (e.g., waste heat) fluids, gaseous $CO_2$, super-critical $CO_2$, gaseous $H_2S$, super-critical $H_2S$, or other heated thermal fluids into the subsurface formation. $CO_2$, gaseous $H_2S$, and/or super-critical $H_2S$ may be dissolved in or combined with specifically treated fluids and injected into the subsurface formation to increase hydrogen generation.

In some embodiments, heat may be transferred to the subsurface formation via injection of hot supercritical $CO_2$ or $H_2S$, as well as or in place of hot water. In other embodiments, other means of heat may be applied downhole to the rock formation, including, but not limited to laser heating, combustion, electrical resistance heating, plasma heating, nuclear heating, heat released by the exothermic nature of the reactions or by other means. In some examples, the subsurface rock formation may be fractured, acid treated, or stimulated to increase porosity and permeability, and to further increase the surface area available for the reactions (e.g., serpentinization and pyritization reactions). Specifically treated fluids can then be heated up at pressure, to form high-pressure fluids with temperatures ranging from 25° C. to 500° C. or thereabouts depending on the physicochemical conditions of the water, pore spaces, and chemical species present in the pore spaces. The heated fluid may then be injected into the fractured subsurface rock formation.

EHP can include cycling various heated fluids described herein in and out of injector well 810 (e.g., "huff and puff" operation) or injection in and out of an injector/producer pair of wells 810 and 815 working together. In some embodiments, a cycle of first injecting specifically treated or heated fluids can be followed by injection of $CO_2$ or $H_2S$ dissolved in the fluids. In some embodiments, a cycle of first injecting $CO_2$ or $H_2S$ dissolved in or combined with the fluids, gaseous $CO_2$ or $H_2S$, or super-critical $CO_2$ or $H_2S$ can be followed by a cycle of injecting specifically treated or heated fluids.

Continuous or cyclic injection of specifically treated or heated thermal fluid and/or reactant can maintain the temperatures of the target rock formation at the selected reaction temperatures (e.g., 25° C. to 500° C.) that enable hydrogen generation and prevent consumption of hydrogen by subsequent reactions (e.g., Sabatier reaction). Given rock mineralogy, rock chemistry, and pore fluids chemistry may differ from prospect to prospect, the selected reaction temperature may be different in different settings. For example, as shown in FIG. 8, the subsurface formation can be located near a steam chamber 820 that contributes to higher temperatures. The steam chamber 820 can be separated from the subsurface formation 805 by unreacted rock 825. The selected temperature may be adjusted for each prospect based on experiments conducted on cores and rock samples or pore fluid samples taken from a given prospect.

Systems suitable for use in the techniques disclosed herein may include one or more wells (e.g., injector or producer wells) extending through the ground surface 830 and a cap rock 835, a source of one or more of carbon dioxide, dihydrogen sulfide, or water, one or more heat sources (e.g., heat exchanger) to heat the carbon dioxide, dihydrogen sulfide, or water, one or more pumps to pump the one or more of carbon dioxide, dihydrogen sulfide, or water into the one or more wells, a downhole temperature sensor, hydrogen collection equipment, and a controller operably coupled to one or more of the foregoing to control injection of a fluid (e.g., heated water, dihydrogen sulfide, and carbon dioxide) into the subsurface formation and collection of hydrogen from the subsurface formation.

Other processes or plants having $CO_2$, $H_2S$, or waste heat may be similarly integrated with subsurface or surface hydrogen generation systems and processes. For example, $CO_2$ from any of the $CO_2$ producing processes or systems disclosed herein may be integrated with subsurface and/or surface hydrogen generation to enhance hydrogen production or to enhance carbon mineralization in association with subsurface hydrogen generation to reduce the $CO_2$ emissions of these processes. $H_2S$ from any of the $H_2S$ producing processes or systems disclosed herein may be integrated with subsurface and/or surface hydrogen generation to enhance hydrogen production or for sulfur mineralization in association with subsurface hydrogen generation to reduce the $H_2S$ emissions of these processes. Likewise, heat from any of the heat producing processes or systems disclosed herein may be integrated with subsurface or surface hydrogen generation to enhance hydrogen production and for carbon or sulfur mineralization in association with subsurface hydrogen generation to reduce the emissions of these processes.

The techniques disclosed herein may be carried out with any of the equipment (e.g., energy production systems, chemical production systems, or the like) disclosed herein, such as in an integrated system including a well, subsurface formation, and the surface system. Systems suitable for use in the techniques disclosed herein may include one or more pumps to pump one or more of water, hydrogen, dihydrogen sulfide, carbon dioxide, or a combination of dihydrogen sulfide and carbon dioxide with or without other fluids or chemicals into the one or more wells, a downhole temperature sensor, hydrogen collection equipment, heat exchange equipment, and a controller operably coupled to one or more of the foregoing to control injection of fluid (e.g., solution) and heat into the subsurface formation and collection of hydrogen from the subsurface formation. Systems include a transfer system for transferring one or more of $H_2S$, $CO_2$, heat, fluids, or chemicals to an apparatus or system (e.g., pump(s), conduit(s), well, etc.) for inputting the one or more of $H_2S$, $CO_2$, other fluids or chemicals, or heat to porous rock.

Figure 9:
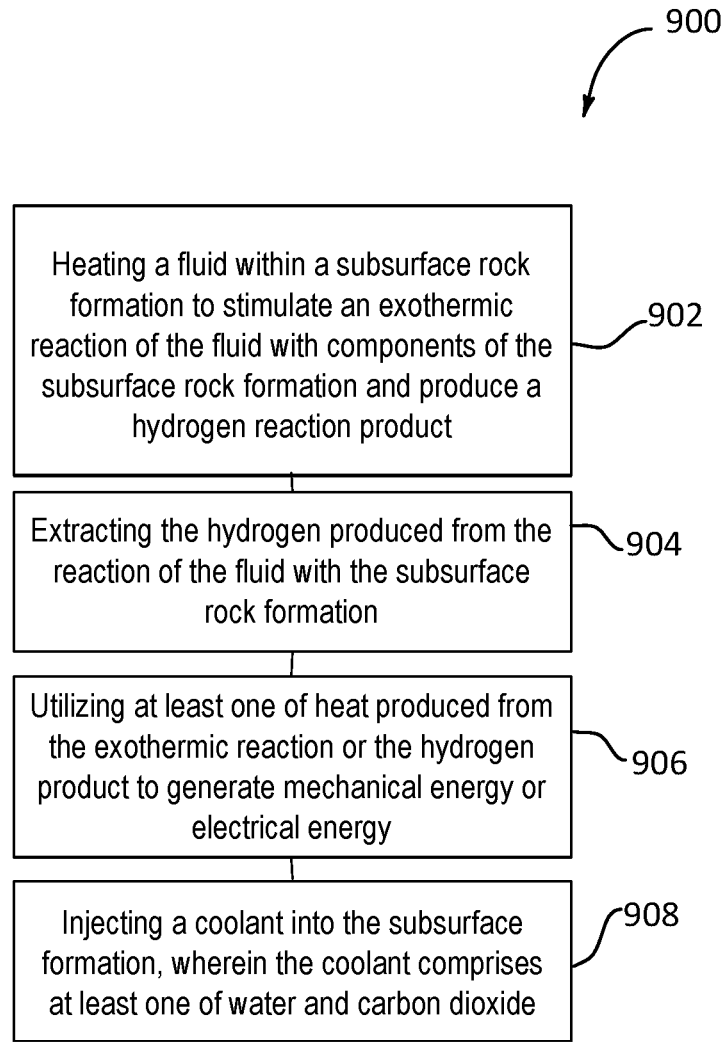
FIG. 9 is a flow chart of a method of producing hydrogen from a subsurface rock formation, according to an embodiment.

FIG. 9 is a flow chart of a method 900 of producing hydrogen from a subsurface rock formation, according to an embodiment. The method 900 can include act 902 of heating a fluid including at least one of dihydrogen sulfide, carbon dioxide, or a mixture thereof within a subsurface rock formation to stimulate an exothermic reaction of the fluid with components of the subsurface rock formation and produce a hydrogen reaction product. In some examples, the fluid can further include at least one of water, steam, or a supercritical fluid. The exothermic reaction can include the decarbonation, serpentinization, and pyritization reactions.

In some examples, the subsurface rock formation can include a fractured or acid treated porous rock. The subsurface rock formation can include one or more of iron-rich rock, mafic igneous rock, metamorphosed or hydrothermally altered mafic igneous rock, olivine- or pyroxene-bearing igneous, metamorphic, or sedimentary rock or sediment, metamorphosed or hydrothermally altered olivine- or pyroxene-bearing igneous, metamorphic, or sedimentary rock or sediment, serpentine mineral bearing rock or sediment, partially or completely serpentinized rock, serpentinite, pyrite, iron-rich sandstone, other iron-rich sedimentary rock, or iron-rich sediments.

The method 900 can also include an act 904 of extracting the hydrogen produced from the reaction of the fluid with the subsurface rock formation. In some examples, extracting hydrogen produced from the reaction of the fluid with the subsurface rock formation includes extracting heated water from the subsurface formation. The heated water can include dissolved hydrogen and/or other reaction products that can be extracted and utilized for energy production.

The method 900 can also include an act 906 of utilizing at least one of heat produced from the exothermic reaction or the hydrogen product to generate mechanical energy or electrical energy. In some examples, the mechanical or electrical energy is generated by cycling the hydrogen through a gas turbine or a heated fluid through a steam turbine. In some examples, the heated fluid can be a primary fluid in a heat exchange system. The primary fluid can be configured to heat a secondary fluid and the secondary fluid can be cycled through the steam turbine.

In some examples, utilizing at least one of heat produced from the exothermic reaction or the hydrogen product to generate mechanical energy or electrical energy comprises using at least one of a steam generator, a turbine, a Rankin cycle plant, an Allam Cycle plant, an economizer, a boiler, or a superheater. In some examples, utilizing at least one of heat produced from the exothermic reaction or the hydrogen product to generate mechanical energy or electrical energy can include a mafic rock serpentinization/decarbonation (MRSD) reactor or processing plant. An MRSD processing plant can include water, $CO_2$, and iron-rich (e.g., mafic) rock inputs into an MRSD reactor. The water can be liquid or steam and the iron-rich rock can be ground up (comminuted), in some embodiments. The products of the reactor can include enhanced aggregates, including magnetite, rare earth elements, and precious metals (e.g., cobalt, nickel) along with hydrogen. Further, a substantial amount of heat is also generated in the mineralization reactions. In some embodiments, at least 7 kWh of heat can be generated for every ton of $CO_2$ that is mineralized. In some embodiments, parasitic energy loss in the system or process can be used to grind, mill, or comminute the iron-rich rock to the required particle sizes optimal for the reaction and heat up the iron-rich rock, $CO_2$, and water feedstocks that are injected into the reactor. Parasitic losses can account for less than 10% of the heat generated by the reaction. A significant amount of waste heat can thus be generated by the process, and given a sufficiently high reaction temperature, that waste heat may be utilized in several ways.

Power production currently is largely achieved through the combustion of fossil fuels (e.g., coal, natural gas), which are major emitters of sulfur and $CO_2$, which releases greenhouse gases which are correlated with climate change, ocean acidification, and inflict a myriad of other environmental impacts. Renewable and carbon free power sources are achieving reductions in cost but are severely disadvantaged by intermittency (e.g., solar and wind), seasonal variability and damage to ecosystems (e.g., hydropower), and/or high costs and long development cycles (e.g., geothermal power, nuclear power). Moreover, the renewable power supplies that suffer from intermittency (i.e., solar, wind) are further marginalized because of the low efficiency and resource scarcity of battery storage of the electricity generated by these processes. In these cases, precious metals such as lithium, cobalt, and nickel that are targeted for energy storage/batteries are increasingly rare and in demand, and in most cases are now considered critical resources by most developed nations.

Mafic rock serpentinization/decarbonation reactions (MRSD) can be achieved when mafic iron-rich rock is exposed to water and $CO_2$ in optimal physicochemical conditions. The MRSD reactions can be used for sequestering $CO_2$, producing hydrogen, and producing refined aggregates (e.g., silica and carbonates), minerals (e.g., magnesite), and concentrating or producing precious metals (e.g., lithium, cobalt, nickel, and rare earth elements). The rare earth elements can include at least one of Scandium, Yttrium, Lanthanum, Cerium, Praseodymium, Neodymium, Promethium, Samarium, Europium, Gadolinium, Terbium, Dysprosium, Holmium, Erbium, Thulium, Ytterbium, and Lutetium. The precious metal can include at least one of Iridium, Indium, Gallium, Tellurium, Bismuth, Mercury, Rhenium, Ruthenium, Germanium, Beryllium, Rhodium, Palladium, Osmium, Platinum, Silver, and Gold. When extracting waste heat from the reactor at temperatures of 350° C. to 450° C., a heating fluid could be extracted and utilized to produce power or provide heat for other industrial uses.

A system including the equipment for carrying out the MRSD reactions could provide carbon negative baseload electricity at competitive price without direct or indirect carbon emissions, and without requiring the sequestration of $CO_2$ into reservoir rock, saline aquifers, or other forms as is required following combustion of fossil fuels. Assuming a typical net thermal to electric efficiency of 35%, a 531 MW power production facility could be partially powered utilizing the waste heat from the MRSD reaction. This equates to a carbon-negative power production facility capable of producing more than 500 MW of power. For comparison, a similarly sized coal power plant emits about 0.9 $tCO_2$ per Megawatt-hour of electricity (MWh) and a combined cycle natural gas power plant emits about 0.4 $tCO_2$ per MWh, while the disclosed MRSD facility would instead sequester about 0.47 $tCO_2$ per MWh. The systems and methods described herein provide multiple embodiments for integrating and utilizing that waste heat as well as integrating other MRSD feedstocks. Techno-economic analysis suggests that if sales of solid aggregate and hydrogen can cover the capital recovery and operating costs of the MRSD plant and if $10.00 (higher values are now achievable based on the revised U.S. IRS 45Q(b)) per $tCO_2$ can be secured for permanent sequestration of the $CO_2$ (current U.S. IRS 45Q tax credit rates are $85/metric ton for permanent storage), power could be sold from an integrated power plant at a price of about $50-60 per MWh. At this price point, the methods and systems described herein would have massive ramifications for power markets in any country eager to replace its high $CO_2$ emissions fleet with alternative power production facilities. Geographically, any region with iron-rich rock resources and sources of $CO_2$ (anthropogenic, natural emissions, or obtained by direct air capture (DAC)) that are available for capture and processing could produce power using the systems and methods disclosed herein.

In some embodiments, a stream of product heat as steam can be included by cycling back a slip stream of the steam to the MRSD reactor as a feedstock. In some embodiments, steam produced from the reactor can be utilized to address parasitic heating requirements for other reactants. For example, the steam can pre-heat the iron-rich rock inputs. A substantial portion of the steam can be directed to a steam turbine (e.g., power block) where it could be utilized in one or more turbine stages to produce electricity or mechanical energy. The steam can be split to all three of the MRSD, the pre-heat the iron-rich rock or carbon dioxide inputs, and the steam turbine. The steam can then be cooled in a condenser. In some embodiments, the condensate can be recirculated through the system. The condensate can enter a heat exchanger that can heat the condensate to produce steam. The condensate may be supplemented with make-up water prior to passing through the heat exchanger. In such examples, the heat source that initially produces the steam can be reused to reheat the condensed steam. In some examples, waste heat can be extracted from the MRSD reactor in the form of superheated steam, according to an embodiment. The MRSD reactor can be equipped to heat the input water to a temperature higher than its vaporization point. The steam produced in the MRSD reactor can be superheated. This may be accomplished via several methods, such as injecting more water than is required for the reaction, allowing the bulk of the waste heat to be extracted via the excess water. The MRSD reactor can produce a dry steam along with the hydrogen and enhanced aggregate of magnetite, other iron mineral phases, rare earth elements, and precious metals.

Superheated steam can be used to produce power or mechanical energy, according to an embodiment. In some embodiments, the superheated steam produced in the MRSD reactor can be directed towards a single or multistage turbine, with a slip stream being utilized to preheat the MRSD reactants. The steam turbine can extract energy from the pressurized steam to rotate an output shaft of the turbine. In some embodiments, the turbine can derive thermodynamic efficiency from the use of multiple stages in the expansion of the steam, which results in a closer approach to the ideal reversible expansion process. Because the turbine generates rotary motion, it is particularly suited to be used to drive an electrical generator, to produce electrical energy. In some embodiments, the steam from the reactor can also include a slip stream being utilized to preheat the MRSD reactants. In some embodiments, the exhaust steam from the tubing can be cooled by a condenser and further recirculated through the MRSD reactor. The hydrogen, magnetite, carbon enriched rock products (e.g., enhanced aggregate of magnesite), rare earth elements, and precious metals can be output from the system.

In some embodiments, due to lower temperature or chemical nature of steam or other heating fluids extracted from the MRSD, the waste heat from the MSRD reactor can be exchanged with a secondary heating fluid, such as via a heat exchanger. The vapor can be maintained in a closed loop primary system, coupled to a heat exchanger to transfer energy to the secondary heating fluid. In some embodiments, the secondary heating fluid can include super critical $CO_2$, an organic fluid such as those used in binary geothermal cycles (e.g., isopentane, propane, freon substitutes, or ammonia), water, or other suitable fluids. The secondary heating fluid can be used in a Rankine power cycle. In a Rankine cycle, heat energy can be supplied to the system from the MRSD reactor via a heat exchanger, where the secondary fluid can be converted to a high-pressure gaseous state (e.g., steam) in order to turn a turbine to produce mechanical or electrical energy. After passing through the turbine, the fluid condenses back into a liquid state as waste heat energy is removed in a condenser before being returned to heat exchanger, completing the cycle. In some embodiments, multiple heat exchangers can be included in the secondary system. The waste heat from each product stream of the MRSD reactor can be captured in parallel or series by the secondary heating fluid, each stream increasing either the volume or the temperature of the secondary heating fluid prior to injecting into a turbine.

In some examples, supercritical $CO_2$ ($sCO_2$) can be injected into the MRSD reactor and utilized to extract a large portion of the waste heat from the system, according to an embodiment. Supercritical carbon dioxide ($sCO_2$) is a fluid state of carbon dioxide where it is held at or above its critical temperature (304.13 K, 31.0° C., 87.8° F.) and critical pressure (7.3773 MPa, 72.8 atm, 1,070 psi, 73.8 bar). The supercritical $CO_2$ expands to fill its container like a gas but with a density like that of a liquid. The heated $sCO_2$ can be injected into a $sCO_2$ turbine to produce electrical or mechanical energy. The supercritical $CO_2$ can then be cooled in a cooler (e.g., heat exchanger, condenser, or the like) and reinjected into the MRSD reactor. A make-up $CO_2$ stream from an external source can also be injected into the reactor along with the recycled $CO_2$ to account for the lost $CO_2$ through the carbon mineralization process from the MRSD reaction. In some embodiments, the $sCO_2$ cooler can be heat integrated to pre-heat water and rock reactants input into the MRSD reactor. The hydrogen, carbon enriched rock products (e.g., enhanced aggregate of magnetite or magnesite), rare earth elements, and precious metals can be output from the system.

In some examples, an MRSD reactor can be integrated with a power plant operating with an Allam cycle. In some embodiments, the Allam cycle inputs an oxygen stream and natural gas stream and produces water, $CO_2$, and electricity with a $sCO_2$ power cycle. The Allam cycle power block includes one or more turbines for producing electrical or mechanical power, one or more heat exchangers, cooling equipment, water separators, compressors, or pumps. The oxygen stream can be pure oxygen. In the Allam cycle, $sCO_2$ can be used as the heating fluid. Excess $CO_2$ can be generated in the Allam cycle and made available for use or sequestration outside the battery limits of the plant. The excess $CO_2$ can be injected as a reactant into the MRSD reactor system, and the waste heat can be utilized to increase the overall efficiency of the Allam cycle. Further, in some embodiments, waste heat from the MRSD system can be included and transferred as $sCO_2$, steam, or other heating fluids. Hydrogen generated via the MRSD process could also be co-fired with the natural gas to increase efficiency. The hydrogen, carbon enriched rock products (e.g., enhanced aggregate of magnetite or magnesite), rare earth elements, and precious metals can be output from the system.

In some examples, a system having an MRSD plant and a combined cycle power plant can be designed to use natural gas or a blend of natural gas and hydrogen, according to an embodiment. In some examples, hydrogen from the MRSD reactor can be co-fired with natural gas through a gas turbine. The gas turbine compresses air and mixes it with fuel (e.g., hydrogen and/or natural gas) that is then burned at extremely high temperatures, creating a hot gas. The hot air-and-fuel mixture then moves through blades in the turbine, generating mechanical or electrical energy. The exhaust from the gas turbine can be utilized to produce steam in a heat recovery steam generator (HRSG). In some embodiments, waste heat from the MRSD reactor, in the form of steam or other heating fluid, can be utilized to augment the output of the heat recovery steam generator and increase the power and/or capacity of the steam turbine. In some embodiments, a carbon capture system can be included in the system. For example, the carbon capture system can be placed at the flue gas outlet of the HRSG and the captured, purified $CO_2$ can be further utilized as a reactant in the MRSD system. In some embodiments, mixed flue gas consisting of $CO_2$ and various sulfur species can be utilized as a reactant in the MRSD system, independent of the presence of various nitrogen species, argon, or other gases. The enriched rock products (e.g., enhanced aggregate of magnetite or magnesite), rare earth elements, and precious metals can be output from the system.

In some examples, an MRSD plant can be integrated with a coal plant. In some embodiments, hydrogen from the MRSD reactor can be co-fired with the coal fuel of the coal fired power plant. Steam produced from the MRSD waste heat can be conveyed to the coal plant and utilized in a component of the coal fired power plant, such as a steam turbine, to produce mechanical or electrical energy. In some embodiments, an economizer, boiler, or superheater of the power plant system can use the steam from the MRSD reactor waste heat. For example, the steam can be mixed with the produced steam of the coal boiler prior to injection into a steam turbine. The exhaust steam can then be cooled in a condenser and recirculated as water, where at least a portion of the water can be included as a reactant for the MRSD system. In some embodiments, an iron-rich rock handling system can be integrated with coal handling systems. The integration can improve economy of scale, labor, and transport of both reactants and products. In some embodiments, a $CO_2$ capture system can be placed at a flue gas exhaust of the coal boiler of a coal fired power plant, where $CO_2$ can be captured and purified. The $CO_2$ can then be utilized as a reactant in the MRSD system, where it can be ultimately mineralized into high value magnesite or bulk aggregate product. In some embodiments, mixed flue gas consisting of $CO_2$ and various sulfur species, can be utilized as a reactant in the MRSD system, independent of the presence of various nitrogen species, argon, or other gases. In such embodiments, carbon dioxide and sulfur can be mineralized into high value magnesite and bulk aggregate. In such embodiments, sulfur emissions reductions can be quantified and credited for further cost savings. The enriched rock products (e.g., enhanced aggregate of magnesite or magnesite), rare earth elements, and precious metals can be output from the system.

In some examples, a system having an MRSD plant can be integrated with a coal plant in which waste heat from the MRSD system replaces the use of coal fuel and the coal boiler. Waste heat can be extracted from the MRSD reactor in the form of steam or superheated steam. Hydrogen from the MRSD reactor can be utilized in a heater to dry and/or further superheat the steam. The dry steam can then be injected into a steam turbine of the coal plant (which can replace a boiler) to produce electrical or mechanical energy. The steam exiting the turbine can be cooled in a condenser to form a condensate and then be reinjected into the MRSD reactor where it is used as a reactant and a coolant to extract waste heat. In an embodiment, $CO_2$ for the MRSD reactor can be provided by an external secondary source. In some embodiments, rock reactants (e.g., mafic rock or other iron-rich rocks) can be processed for use in the MRSD by retrofitted solids handling equipment at the coal plant. Such solids handling equipment can include mills, pulverizers, hoppers, and pile management. The enriched rock products (e.g., enhanced aggregate of magnetite or magnesite), a portion of the hydrogen produced in the MRSD reactor, rare earth elements, and precious metals can be output from the system.

In some examples, an MRSD plant integrated with a power block and a Directly Reduced Iron (DRI) steel plant, according to an embodiment. DRI, also called sponge iron, can be produced from the direct reduction of iron ore (in the form of lumps, pellets, or fines) into iron by a reducing gas or elemental carbon produced from natural gas or coal. Reduced iron oxides can be converted to metallic iron at temperatures below the melting point of iron. In some embodiments, hydrogen and magnetite from the MRSD reactor can be utilized as inputs into the DRI steel plant. Steam generated from the MRSD reactor (such as through a waste heat recovery system) can be utilized in a power plant to generate electricity, such as by turning a turbine in the power block. In some embodiments, the electricity produced by the turbine can be utilized by the DRI steel plant. The power plant or block output can be augmented via natural gas or coal. In some embodiments, a carbon capture module can be placed at the flue gas exhaust point of the coal or gas plant of the power block. In such embodiments, captured $CO_2$ can then be utilized as a reactant for the MRSD system and mineralized into the resulting aggregate. While external reactants may also be used to balance the needs of each system, this system and method can provide means by which "green" steel can be manufactured at much lower cost compared to current methodologies.

In some examples, a system to extract energy from waste heat can include using a turbine. A water produced in the reaction zone can include the temperature $T_2$. The water can be run through a process unit to treat, de-scale, or otherwise condition the water prior to injecting it into a turbine, such as a simple steam turbine. In some embodiments, a flash tank or other steam generator can be included upstream from the turbine. After the turbine, the water can be routed through a condenser. After condensation the condensed water can be run through another process unit (e.g., heater) that treats it for selected decarbonation/serpentinization properties before being injected back downhole, optionally along with make-up water. The turbine can produce mechanical or electrical energy. In some examples, the turbine system can further including integrating hydrogen to increase the thermal efficiency of the system. In some embodiments, the produced hydrogen (e.g., hydrogen produced in the reactions in the subsurface formation) can be used in a heater, such as to heat the produced water (e.g., water produced from the reactions in the subsurface formation) from $T_2$ to a higher third temperature ($T_3$). The heater can increase the steam fraction in the produced water. In some embodiments, the heater can superheat the product water stream prior to injection into a steam turbine to increase the net thermal efficiency of the system. The water exiting the turbine can be directed through a condenser prior to injection into the subsurface formation.

In some examples, a system to extract energy from waste heat can include using a secondary heating fluid. In some embodiments, the hot produced water or steam can be sent to a heat exchanger at a temperature $T_2$. A second heating fluid can be included in the system, such as in a secondary (closed) loop, which is heated from a temperature $T_3$ in the heat exchanger by the hot produced water to a temperature $T_4$ and then run through a turbine prior to being condensed and recirculated through the secondary loop. The secondary heating fluid can include water, purified water, an organic fluid similar to the types used in binary cycle geothermal power plants, or any other suitable fluid that is composed to expand or vaporize responsive to the temperature range of the produced water. The inclusion of the secondary loop can reduce the likelihood that the injected and produced water has to be significantly treated prior to injection into a steam turbine. Further, the secondary loop can utilize organic Rankine cycle equipment common to the geothermal industry. The secondary loop may include a heater for heating the secondary fluid, in addition to the heat exchanger. In some embodiments, produced hydrogen can be used (combusted) in the heater to increase the temperature or vapor fraction of the secondary heating fluid and thus increase the thermal efficiency of the system. The produced water can be recycled and reinjected back into the well after being cooled to a temperature $T_1$ (below $T_2$) in the heat exchanger.

In some examples, a system can include supercritical $CO_2$ injected into a subsurface formation to extract energy. In some embodiments, the supercritical $CO_2$ ($sCO_2$) can be injected downhole into the reaction zone at a temperature $T_1$ and a rate that exceeds the kinetic rate of the reaction (e.g., decarbonation reaction). Water can be injected with the $sCO_2$. Accordingly, hydrogen can be produced by both pyritization and decarbonation reactions. Injecting $sCO_2$ into the system can produce $sCO_2$ or gaseous $CO_2$ and hydrogen can be extracted from the reaction zone at temperature $T_2$. The conditions in the reaction zone can maintain at least a portion of the injected $sCO_2$ in supercritical conditions. The $SCO_2/CO_2(gas)-H_2$ product blend can then be extracted through a production well, routed to a separator, and then utilized separately for downstream applications.

In some embodiments, the $sCO_2$ from the separator can be utilized in a $sCO_2$ turbine or further heated from temperature $T_2$ to a higher temperature $T_3$ in a fired heater prior to use in the turbine. The fired heater can be fueled, at least in part, by the produced hydrogen from various forms of EHP. In some embodiments, after being processed by the separator, the $sCO_2$ can be cooled and injected back downhole. A make-up stream of $sCO_2$ can be included prior to injection in some embodiments. The $sCO_2$ is highly reactive with mafic rock in the reaction zone and readily produces water while sequestering carbon dioxide. Further, the $sCO_2$ can be utilized with high energy efficiency and very low capital cost in a $sCO_2$ power block (e.g., turbine).

In some examples, a system form generating power can include supercritical $CO_2$ injected into an Allam Cycle power block, according to an embodiment. Produced $sCO_2$ can be further heated by fired natural gas, methane, and/or hydrogen and oxygen to generate power in a $sCO_2$ turbine. In some embodiments, the Allam cycle power block inputs an oxygen stream and natural gas stream and produces water, $CO_2$, and electricity with a $sCO_2$ power cycle. The oxygen stream can be a pure oxygen. In the Allam cycle power block, $sCO_2$ can be used as the heating fluid. In some embodiments, cooled $sCO_2$ from the power block, from the EHP produced $sCO_2$ stream and from the combustion reaction of natural gas and oxygen, can be combined and injected back downhole as a reactant for additional carbon mineralization and to enhance further hydrogen production. In some embodiments, water produced from the Allam Cycle power block can be pumped and injected downhole to serve as a reactant for the serpentinization reaction. The Allam cycle power block may include one or more of a combustor, a turbine, one or more heat exchangers, a cooling system (e.g., condenser), or the like.

In some examples, a system for generating energy can include a gas turbine combined with outputs from an EHP system, and a steam turbine. The gas turbine can be fired with natural gas, hydrogen (produced by the EHP system or otherwise acquired), or a combination thereof. In some embodiments, the exhaust from the gas turbine can be used to boil and heat a stream of produced water from the production well of an EHP system. The EHP system can include any of the embodiments described above for enhanced hydrogen production. The produced water can be run through a steam turbine. In some embodiments, after the exhaust of the gas turbine is run through a heat recovery steam generator (HRGS), it can also be routed through a $CO_2$ capture system or process, with the captured $CO_2$ being utilized as an injected reactant in the EHP system. As such, a carbon-free or carbon negative combined cycle power plant utilizing waste heat from the ground to further improve efficiency can be included or created via modification of existing facilities. After the produced water is run through the steam generator, the produced water may be injected into a subsurface formation through an EHP system.

In some examples, the gas turbine can be combined with outputs from an EHP system, and a secondary heating fluid to drive a steam turbine, according to an embodiment. In some embodiments, the hot produced water and/or steam can be sent to a heat exchanger. For example, the hot produced water from the EHP system can be processed in a heat exchanger with a secondary heating fluid in a secondary loop to heat the secondary heating fluid. The secondary heating fluid can be run through a turbine (e.g., steam turbine) prior to being condensed and recirculated through the secondary loop. In an embodiment, the secondary heating fluid can include water, purified water, an organic fluid similar to the types used in binary cycle geothermal power plants, or any other suitable fluid that has an appropriate composition for the temperature range of the produced water. The inclusion of the secondary loop can reduce the likelihood that the injected and produced water has to be significantly treated prior to injection into a steam turbine. The secondary loop can utilize organic Rankine cycle equipment such as any used in the geothermal industry. Produced hydrogen can be used in a supplementary heater to increase the temperature or vapor fraction of the secondary heating fluid and thus increase the thermal efficiency of the system. For example, the system can include a gas turbine for burning hydrogen, natural gas, or another fuel. The system can include a heat recovery steam generator in thermal communication with the secondary loop where the exhaust from the gas turbine is routed through the heat recovery steam generator where it is used to heat the secondary heating fluid. The produced water can be reinjected into the subsurface formation of the EHP system, such as after heating the secondary fluid in the heat exchanger.

In some examples, a system in a subsurface formation can include an injection well and production well both intersecting and tied together via a fracture system, according to an embodiment. The subsurface formation may include a reaction zone and a heating zone. The reaction zone can include the injection well and production well therein, both intersecting and tied together via a fracture system. In some embodiments, the reaction zone in the rock that includes an injection well and production well both intersecting and tied together via a fracture system, can be pressure isolated from the heating zone based on the insulating capacity of the rock matrix, which further prevents advection or convection of heat or heated fluids.

In some embodiments, a separate and disconnected set of fractures are in place to allow for more standard geothermal injection and production wells that extract heat from the boundaries of the reaction zone. In such embodiments, a number of geothermal injection and production wells can be drilled. The wells can create a three-dimensional boundary around the reaction zone. As such, the temperature can be controlled in the reaction zone to control the amount of hydrogen production. In some embodiments, at the surface, the produced hot water or steam from the heating zone can be run through a flash system, binary cycle, or other heat recovery system. Hydrogen produced from the reaction zone can be utilized in a separate application or can be burned as a fuel to increase steam fraction or temperature of hot water or steam from the heating zone to increase the thermal efficiency of a power block or cycle. In some embodiments, the system can be included in a region with limited to no geothermal activity as a greenfield project or implemented on site or at least proximal to an existing geothermal power plant where a hot reaction zone, though pressure-isolated from the geothermal injection and production wells, can be configured to add heat into surrounding rock, alleviating, reducing, or even reversing thermal decline of geothermal resource.

In some embodiments, waste heat carried by $CO_2$, steam, or other means can be utilized to stimulate further EHP reactions by injection of those fluids into adjacent wells mitigating the need for the top side integration of heat. In another embodiment, the hot produced water and/or steam can be heat exchanged with a second heating fluid which can then be recirculated through the secondary loop to provide base heating to heat $CO_2$, $H_2S$, or water in preparation for injection by EHP.

In some examples, the method 900 can further include an act 908 of injecting a coolant into the subsurface formation, wherein the coolant comprises at least one of water or carbon dioxide. Heat can be generated within the reaction zone of the rock as a result of the exothermic nature of the reactions. This heat will conduct outwards from the reaction zone into surrounding rock. The rate of heat conduction away from the reaction zone, the rate of reaction, and the flow and ratio of reactants governs the steady state temperature of rock in the reaction zone. In some embodiments, using a coolant may contribute to temperature control and production rates from the reaction zone.

Figure 10:
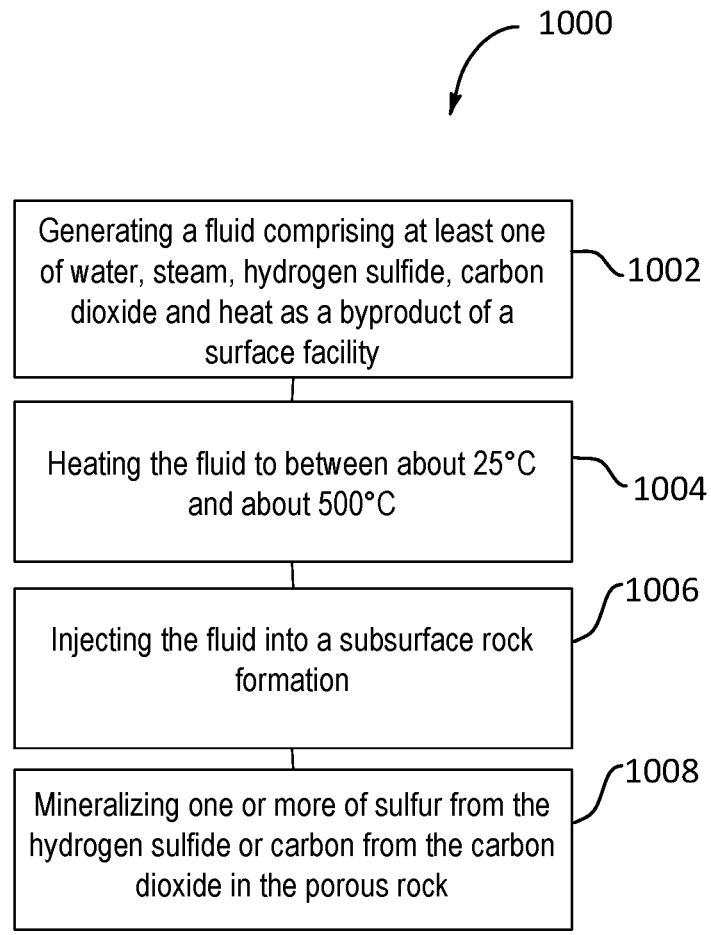
FIG. 10 is a flow chart of a method of producing hydrogen and sequester carbon or sulfur, according to an embodiment.

FIG. 10 is a flow chart of a method 1000 to produce hydrogen and sequester carbon or sulfur. The method 1000 can include an act 1002 of generating a fluid comprising at least one of water, steam, hydrogen sulfide, carbon dioxide and heat as a byproduct of a surface facility. In some examples, the surface facility can include at least one of a combustion heater, a boiler, a heat exchanger, or the like. In some examples, the surface facility can include a coal plant, a nuclear plant, electrolysis, or the like. In some embodiments, the fluid can include at least one of steam, water, brine, gray water, wastewater, seawater, or water from a natural geothermal system. The method 1000 can include an act 1004 of heating the fluid to between about 25° C. and about 500° C. In some examples, heating the fluid can include generating heat from an iron-rich rock serpentinization/decarbonation reaction. The iron-rich rock can include a crushed rock. In some examples, the reaction further generates at least one of magnetite, a rare earth element, or a precious metal. In some examples, the rare earth element can include at least one of Scandium, Yttrium, Lanthanum, Cerium, Praseodymium, Neodymium, Promethium, Samarium, Europium, Gadolinium, Terbium, Dysprosium, Holmium, Erbium, Thulium, Ytterbium, and Lutetium and the precious metal can include at least one of Iridium, Indium, Gallium, Tellurium, Bismuth, Mercury, Rhenium, Ruthenium, Germanium, Beryllium, Rhodium, Palladium, Osmium, Platinum, Silver, and Gold.

The method 1000 can include an act 1006 of injecting the fluid into a subsurface rock formation. In some examples, the act 1006 and 1004 can occur concurrently. In other words, injection of the fluid and the heating of the fluid is concurrent, wherein the heating occurs within the subsurface rock formation. In some examples, the fluid can be injected through injector wells and/or pumps as shown in FIG. 8. In some examples, the subsurface rock formation comprises a fractured or acid treated porous rock.

The method 1000 can include an act 1008 of mineralizing one or more of sulfur from the hydrogen sulfide or carbon from the carbon dioxide in the subsurface rock formation. In some examples, mineralizing carbon from the carbon dioxide can generate at least 7 kWh of heat per ton of carbon dioxide generated.

Figure 11:
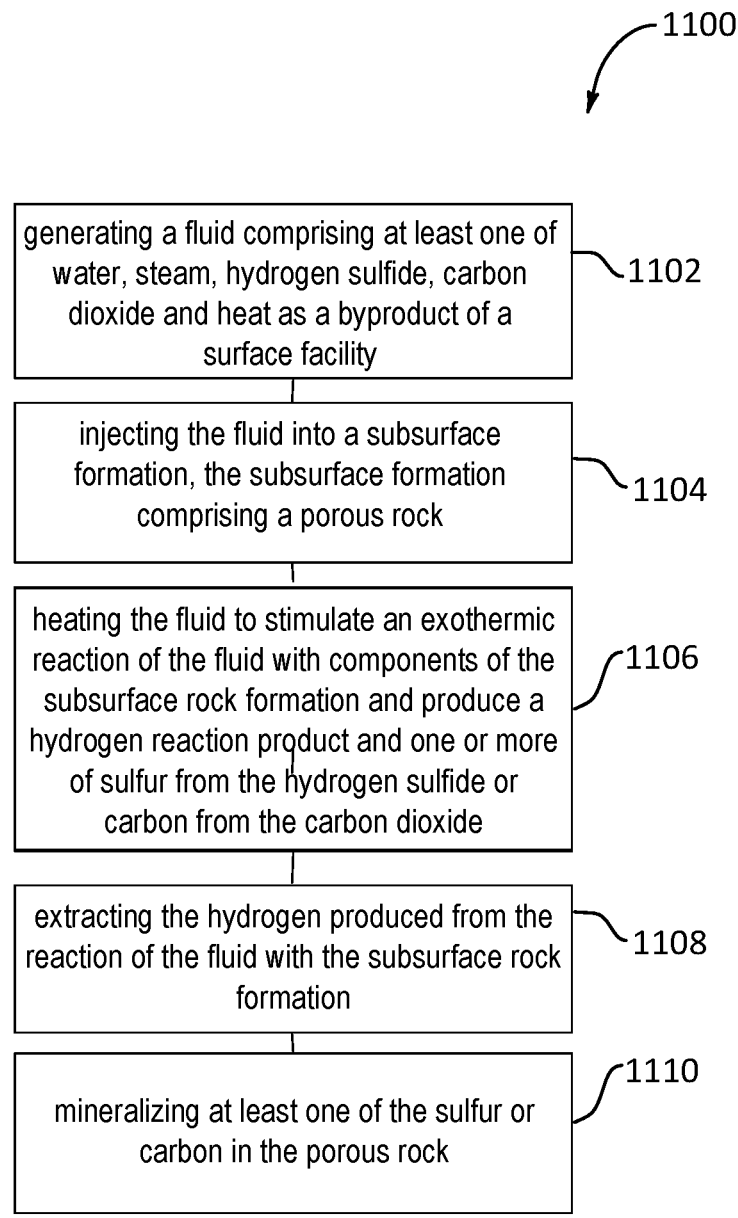
FIG. 11 is a flow chart of a method of producing hydrogen and sequester carbon or sulfur, according to an embodiment.

FIG. 11 is a flow chart of a method 1100 to produce hydrogen and sequester carbon or sulfur. The method 1100 can include an act 1102 of generating a fluid comprising at least one of water, steam, hydrogen sulfide, carbon dioxide and heat as a byproduct of a surface facility. The method 1100 can also include an act 1104 of injecting the fluid into a subsurface formation. The subsurface formation can include a porous rock. The method 1100 can also include heating the fluid to stimulate an exothermic reaction of the fluid with components of the subsurface rock formation and produce a hydrogen reaction product and one or more of sulfur from the hydrogen sulfide or carbon from the carbon dioxide. The fluid can be heated to between about 25° C. and about 500° C. The method 1100 can also include an act 1108 of extracting the hydrogen produced from the reaction of the fluid with the subsurface rock formation. The hydrogen can be extracted and used to produce electrical and/or mechanical energy. The method 1100 can further include mineralizing at least one of the sulfur or carbon in the porous rock.

Portions of any of the methods disclosed herein may be used with any of the other methods disclosed herein. For example, portions of the method 900, 1000, or 1100 may be accomplished using the techniques disclosed with respect to the method 400 or 600.

The use of hydrogen as a chemical feedstock and fuel source to replace hydrocarbons and other fossil fuels has been a long term goal of society, but a hydrogen economy has yet to be obtained, primarily because of the long-standing problem in obtaining hydrogen in the amounts and at the costs needed for a viable hydrogen economy. Further, current methods of hydrogen synthesis are extremely carbon and energy intensive. Nonetheless, once formed, hydrogen provides a clean energy source that eliminates the greenhouse gases that are produced from using hydrocarbons, e.g., gas and oil, as an energy source. As a result, various mechanisms for producing low or negative-carbon or "green" hydrogen are being considered in various industrial sectors. Hydrogen is a very useful and important chemical that is used in various industries. The disclosed embodiments provide various systems, methods, and devices that address and provide solutions to this long-standing problem of producing and recovering sufficient amounts of hydrogen, and to obtain this hydrogen in a cost- and energy-effective, low carbon manner.

In the production of natural resources from formations within the earth, a well or borehole is drilled into the earth to the location where the natural resource is believed to be located. Similarly in the sequestration of dihydrogen sulfide, carbon dioxide, or other greenhouse gases in formations within the earth, a well or borehole is drilled into the earth to the location where these gases will be injected, located and sequestered. These natural resources may be hydrogen; helium; carbon dioxide; dihydrogen sulfide; methane or other hydrocarbon gases; a dihydrogen sulfide reservoir; a hydrogen reservoir; a helium reservoir; a carbon dioxide reservoir; a reservoir rich in dihydrogen sulfide; a reservoir rich in hydrocarbons; the natural resource may be fresh water; brackish water; brine; it may be a heat source for geothermal energy; or it may be some other natural resource, ore deposit, mineral, metal, or gem that is located within the ground.

These resource-containing formations may be a few hundred feet, a few thousand feet, or tens of thousands of feet below the surface of the earth, including under the floor of a body of water, e.g., below the sea floor or beneath other natural resources, e.g., below aquifers. In addition to being at various depths within the earth, these formations may cover areas of differing sizes, shapes and volumes.

Typically, and by way of general illustration, in drilling a well an initial borehole is made into the earth, e.g., the surface of land or seabed, and then subsequent and smaller diameter boreholes are drilled to extend the overall depth of the borehole. In this manner as the overall borehole gets deeper its diameter becomes smaller; resulting in what can be envisioned as a telescoping assembly of holes with the largest diameter hole being at the top of the borehole closest to the surface of the earth.

Thus, by way of example, the starting phases of a subsea drill process may be explained in general as follows. Once the drilling rig is positioned on the surface of the water over the area where drilling is to take place, an initial borehole is made by drilling a 36" hole in the earth to a depth of about 200-300 ft. below the seafloor. A 30" casing is inserted into this initial borehole. This 30" casing may also be called a conductor. The 30" conductor may or may not be cemented into place. During this drilling operation a riser is generally not used and the cuttings from the borehole, e.g., the earth and other material removed from the borehole by the drilling activity are returned to the seafloor. Next, a 26" diameter borehole is drilled within the 30" casing, extending the depth of the borehole to about 1,000-1,500 ft. This drilling operation may also be conducted without using a riser. A 20" casing is then inserted into the 30" conductor and 26" borehole. This 20" casing is cemented into place. The 20" casing has a wellhead secured to it. (In other operations an additional smaller diameter borehole may be drilled, and a smaller diameter casing inserted into that borehole with the wellhead being secured to that smaller diameter casing.) A BOP (blow out preventer) is then secured to a riser and lowered by the riser to the sea floor; where the BOP is secured to the wellhead. From this point forward all drilling activity in the borehole takes place through the riser and the BOP.

It should be noted that riserless subsea drilling operations are also contemplated.

For a land-based drill process, the steps are similar, although the large diameter tubulars, 30"-20" are typically not used. Thus, and generally, there is a surface casing that is typically about 13⅜" diameter. This may extend from the surface, e.g., wellhead and BOP, to depths of tens of feet to hundreds of feet. One of the purposes of the surface casing is to meet environmental concerns in protecting ground water and prevent surface casing ventflow of greenhouse gases or flammable gases to groundwater aquifers or the atmosphere. The surface casing should have sufficiently large diameter to allow the drill string, production equipment such as electronic submersible pumps (ESPs) or jet pumps and circulation mud to pass through. Below the casing one or more different diameter intermediate casings may be used. (It is understood that sections of a borehole may not be cased, which sections are referred to as open hole.) These can have diameters in the range of about 9" to about 7," although larger and smaller sizes may be used, and can extend to depths of thousands and tens of thousands of feet. Inside of the casing and extending from a pay zone, or production zone of the borehole up to and through the wellhead on the surface is the production tubing. There may be a single production tubing or multiple production tubings in a single borehole, with each of the production tubing endings being at different depths.

Fluid communication between the formation and the well can be greatly increased by the use of hydraulic fracturing techniques. The first uses of hydraulic fracturing date back to the late 1940s and early 1950s. In general, hydraulic fracturing treatments involve forcing fluids down the well and into the formation, where the fluids enter the formation and crack, e.g., force the layers of rock to break apart or fracture. These fractures create channels or flow paths that may have cross sections of a few microns, to a few millimeters, to several millimeters in size, and potentially larger. The fractures may also extend out from the well in all directions for a few feet, several feet, and tens of feet or further. The fractures may be kept open by using a proppant (e.g., various sized sand or other mineral grains) that are forced down the well with the fracturing fluid in a single operation. It should be remembered that the longitudinal axis of the well in the reservoir may not be vertical: it may be on an angle (either sloping up or down) or it may be horizontal. The section of the well located within the reservoir, i.e., the section of the formation containing the natural resources, can be called the pay zone.

As used herein, unless specified otherwise, the terms "hydrogen exploration and production," "carbon dioxide exploration and production," "helium exploration and production," "dihydrogen sulfide exploration and production," "exploration and production activities," "E&P," and "E&P activities," and similar such terms are to be given their broadest possible meaning, and include surveying, prospecting, exploration, geological analysis, well planning, reservoir planning, reservoir management, drilling a well, workover and completion activities, hydrogen production, flowing of hydrogen from a well, collection of hydrogen, secondary and tertiary recovery from a well, the management of flowing hydrogen from a well, and any other upstream activities.

As used herein, unless specified otherwise, the terms "sulfur mineralization," "sulfur sequestration," "sulfur mitigation," "carbon dioxide mineralization," "carbon dioxide sequestration," "carbon dioxide mitigation," "carbon mineralization," "carbon sequestration," "carbon mitigation,"

and similar such terms are to be given their broadest possible meaning, and include surveying, prospecting, exploration, geological analysis, well planning, reservoir planning, reservoir management, drilling a well, workover and completion activities, sulfur injection, dihydrogen sulfide injection, carbon injection, carbon dioxide injection, supercritical dihydrogen sulfide injection, supercritical carbon dioxide injection, the management of flowing sulfur, dihydrogen sulfide, carbon, carbon dioxide, supercritical dihydrogen sulfide, supercritical carbon dioxide to a well, and any other upstream activities.

As used herein, unless specified otherwise, the term "earth" should be given its broadest possible meaning, and includes, the ground, all natural materials, such as rocks, and artificial materials, such as concrete, borehole casing, piping, or fill, that are or may be found in the ground.

As used herein, unless specified otherwise "offshore" and "offshore drilling activities" and similar such terms are used in their broadest sense and would include drilling activities on, or in, any body of water, whether fresh or salt water, whether manmade or naturally occurring, such as for example rivers, lakes, canals, inland seas, oceans, seas, such as the North Sea, bays and gulfs, such as the Gulf of Mexico. As used herein, unless specified otherwise the term "offshore drilling rig" is to be given its broadest possible meaning and would include fixed towers, tenders, platforms, barges, jack-ups, floating platforms, drill ships, dynamically positioned drill ships, semi-submersibles and dynamically positioned semi-submersibles. As used herein, unless specified otherwise the term "seafloor" is to be given its broadest possible meaning and would include any surface of the earth that lies under, or is at the bottom of, any body of water, whether fresh or salt water, whether manmade or naturally occurring.

As used herein, unless specified otherwise, the term "borehole" should be given its broadest possible meaning and includes any opening that is created in the earth that is substantially longer than it is wide, such as a well, a well bore, a well hole, a micro hole, a slimhole and other terms commonly used or known in the arts to define these types of narrow long passages. Wells would further include exploratory, discovery, production, abandoned, reentered, reworked, recirculation, and injection wells. They would include both cased and uncased wells, and sections of those wells. Uncased wells, or section of wells, also are called open holes, boreholes, open boreholes, open bores, or open hole sections. Boreholes may further have segments or sections that have different orientations, they may have straight sections and arcuate sections and combinations thereof. Thus, as used herein unless expressly provided otherwise, the "bottom" of a borehole, the "bottom surface" of the borehole and similar terms refer to the end of the borehole, i.e., that portion of the borehole furthest along the path of the borehole from the borehole's opening, the surface of the earth, or the borehole's beginning. The terms "side" and "wall" of a borehole should be given their broadest possible meaning and include the longitudinal surfaces of the borehole, whether or not casing or a liner is present, as such, these terms would include the sides of an open borehole or the sides of the casing that has been positioned within a borehole. Boreholes may be made up of a single passage, multiple passages, connected passages, (e.g., branched configuration, fishboned configuration, dual-lateral configuration, trilateral configuration, quadrilateral configuration, pitchfork configuration, pinnate configuration, or comb configuration), and combinations and variations thereof.

Boreholes are generally formed and advanced by using mechanical drilling equipment having a rotating drilling tool, e.g., a bit. For example, and in general, when creating a borehole in the earth, a drilling bit is extending to and into the earth and rotated to create a hole in the earth. To perform the drilling operation, the bit must be forced against the material to be removed with a sufficient force to exceed the shear strength, compressive strength or combinations thereof, of that material. The material that is cut from the earth is generally known as cuttings or drill cuttings, e.g., waste, which may be chips of rock, dust, rock fibers and other types of materials and structures that may be created by the bit's interactions with the earth. These cuttings are typically removed from the borehole by the use of fluids, which fluids can be liquids, foams or gases, or other materials know to the art.

As used herein, unless specified otherwise, the term "drill pipe" is to be given its broadest possible meaning and includes all forms of pipe used for drilling activities; and refers to a single section or piece of pipe. As used herein the terms "stand of drill pipe," "drill pipe stand," "stand of pipe," "stand," and similar type terms should be given their broadest possible meaning and include two, three, or four sections of drill pipe that have been connected, e.g., joined together, typically by joints having threaded connections. As used herein the terms "drill string," "string," "string of drill pipe," string of pipe," and similar type terms are to be given their broadest definition and would include a stand or stands joined together for the purpose of being employed in a borehole. Thus, a drill string could include many stands and many hundreds of sections of drill pipe.

As used herein, unless specified otherwise, the terms "formation," "reservoir," "pay zone," and similar terms, are to be given their broadest possible meanings and would include all locations, areas, and geological features within the earth that contain, may contain, or are believed to contain, hydrogen, carbon dioxide, helium, dihydrogen sulfide, or mixtures thereof.

As used herein, unless specified otherwise, the terms "field," "oil field," "gas field," and similar terms, are to be given their broadest possible meanings, and would include any area of land, sea floor, or water that is loosely or directly associated with a geologic formation, and more particularly with a resource containing formation, thus, a field may have one or more exploratory and producing wells associated with it, a field may have one or more governmental body or private resource leases associated with it, and one or more field(s) may be directly associated with a resource containing formation.

As used herein, unless specified otherwise, the terms "conventional hydrogen," "conventional carbon dioxide," "conventional helium," "conventional dihydrogen sulfide," "conventional natural gas," "conventional," "conventional production," and similar such terms are to be given their broadest possible meaning and include hydrogen, carbon dioxide, helium, or dihydrogen sulfide that are trapped in structures in the earth. Generally, in these conventional formations the hydrogen, carbon dioxide, helium, dihydrogen sulfide, or natural gas have migrated in permeable, or semi-permeable formations to a trap, or area where they are accumulated. Typically, in conventional formations a non-porous, relatively impermeable layer is above, or encompassing the area of accumulated hydrogen, carbon dioxide, helium, dihydrogen sulfide, or natural gas in essence trapping the hydrogen, carbon dioxide, helium, dihydrogen sulfide, or natural gas in the accumulation. Conventional reservoirs have been historically the sources of the vast majority of hydrogen, carbon dioxide, helium, and dihydrogen sulfide observed. As used herein, unless specified otherwise, the terms "unconventional hydrogen," "unconventional carbon dioxide," "unconventional helium," "unconventional dihydrogen sulfide," "unconventional natural gas," "unconventional," "unconventional production," and similar such terms are to be given their broadest possible meaning and includes hydrogen, carbon dioxide, helium, dihydrogen sulfide, or natural gas that are held in impermeable rock, or which have not migrated to traps or areas of accumulation.

As used herein, unless specifically stated otherwise, the term "gold hydrogen" should be given its broadest possible meaning, and generally refers to hydrogen produced from the subsurface by drilling and stimulating iron-rich rock, mafic rock, pyrite, iron-rich sandstone, or iron-rich sediments with or without fracturing or other forms of mechanical stimulation that can provide an abundant source of low or negative carbon emission, low cost, fully dispatchable energy.

As used herein, unless stated otherwise, room temperature is 25° C. And, standard temperature and pressure is 25° C. and 1 atmosphere.

Generally, the term "about" as used herein unless specified otherwise is meant to encompass a variance or range of ±10%, the experimental or instrument error associated with obtaining the stated value, and preferably the larger of these.

As used herein unless specified otherwise, the recitation of ranges of values herein is merely intended to serve as a shorthand method of referring individually to each separate value falling within the range. Unless otherwise indicated herein, each individual value within a range is incorporated into the specification as if it were individually recited herein.

The term "$CO_2e$" is used to define carbon dioxide equivalence of other, more potent greenhouse gases, to carbon dioxide (i.e., methane and nitrous oxide) on a global warming potential basis of 100 years, based on IPCC AR5 methodology. The term "carbon intensity" is taken to mean the lifecycle $CO_2e$ generated per unit mass of a product.

$CO_2$ is widely recognized as a greenhouse gas (GHG), and the continued accumulation of $CO_2$ and other GHGs in the atmosphere are expected to cause problematic changes to global ecosystems and contribute to myriad other problems, such as ocean acidification and sea level rise. The two primary causes of carbon emissions globally are the use of fossil fuels for power generation and transportation.

Given the risks of $CO_2$ emissions, significant work has gone into finding replacements to existing high carbon energy sources, or ways to decarbonize existing energy sources. However, many of these low carbon alternatives have been uneconomic or not dispatchable enough to replace the current options.

The term "sulfur equivalents" of "SOX" is used to define dihydrogen sulfide or sulfur dioxide offset equivalence of sulfur emissions. The term "sulfur intensity" is taken to mean the lifecycle of SOX generated per unit mass of a product.

Sulfur, in various forms, including but not limited to dihydrogen sulfide, sulfur dioxide, sulfuric acid, and sulfate, is widely recognized as a toxic and harmful atmospheric and aqueous pollutant and the deposition of sulfur in soil, waterways, and other environments is expected to cause problematic changes to global ecosystems and contribute to myriad of other problems, such as acid rain, soil acidification, deforestation, ocean acidification, and other toxic impacts. The primary causes of dihydrogen sulfide emissions globally are related to petroleum and natural gas extraction and refining, pulp and paper manufacturing, rayon textile production, waste disposal, landfills, water and sewage treatment facilities, and general waste disposal. Additionally, natural factors such as volcanoes, hot springs, thermal vents, geysers, fumaroles, "sour" natural gas fields, biodegraded oil fields, and geothermal power plants also constitute major naturally occurring sources of dihydrogen sulfide.

Given the risks of dihydrogen sulfide and other forms of sulfur emissions, significant work has gone into sulfur removal technologies, the development of low sulfur fuels, or ways to desulfurize existing energy sources and processes. However, many of these low sulfur alternatives themselves create cost prohibitions, are uneconomic, or limit the dispatchability of energy sources.

Based on the risks of sulfur emissions, the U.S. EPA (IRC 45H) has created a cap-and-trade sulfur credit program for offset, sulfur abatement, and sequestration. The U.S. IRS 45Q tax credit program is a similar tax credit program for carbon dioxide sequestration.

In power generation, the alternatives to the highly reliable, low cost, but high emission sources (gas and coal) are either dispatchable and expensive (e.g., nuclear, hydroelectric, green hydrogen, or blue hydrogen), or inexpensive and intermittent (e.g., solar and wind, green hydrogen in some cases). There is only one existing source that is both lower cost and dispatchable, and that is geothermal. However, geothermal resources are limited, many of the economically productive geothermal resources have already been developed and are nearing end of life, and many geothermal resources are already in decline. As such, the growth outlook for geothermal energy resources is limited without significant technical advances.

Green hydrogen (hydrogen produced from water without the utilization of fossil fuels), which is generated by electrolysis powered from either solar, wind, hydroelectric, or geothermal energy can be a reliable source of low carbon energy when coupled with storage, but high capital cost, intermittent production due to intermittent energy sources or high cost of energy when grid connected, and the high cost and low availability of suitable hydrogen storage resources limits applicability. In addition, electrolysis consumes significantly more energy to produce the hydrogen than what is stored in the hydrogen, resulting in a low round trip efficiency in the system.

Blue hydrogen faces a similar set of problems to green hydrogen: it takes a low cost, high emission fuel source like coal or natural gas, and by adding expensive and parasitic carbon capture facilities, converts this low-cost-high-emission source of energy into a high-cost-low-emission source. Thus, even though large volumes of hydrogen can be formed in processes that subsequently prevent greenhouse gas emissions from reaching the atmosphere, the newly developed hydrogen resource is not cost competitive with other forms of energy derived from fossil fuels. Additionally, the challenges around finding carbon sequestration resources that can be used to permanently store the captured carbon from these processes result in limited opportunities to deploy these technologies today.

Natural hydrogen (or "gold hydrogen"), produced from the subsurface by drilling and stimulating iron-rich rock, mafic igneous rock, metamorphosed or hydrothermally altered mafic igneous rock, olivine- or pyroxene-bearing igneous, metamorphic, or sedimentary rock or sediment, metamorphosed or hydrothermally altered olivine- or pyroxene-bearing igneous, metamorphic, or sedimentary rock or sediment, serpentine mineral bearing rock or sediment, partially or completely serpentinized rock, serpentinite, pyrite, iron-rich sandstone, other iron-rich sedimentary rock, or iron-rich sediments with or without fracturing or other forms of mechanical stimulation can provide an abundant source of low emission, low cost, fully dispatchable energy.

Each of these energy sources and their inherent advantages and limitations are also relevant to transportation. When considering transportation fuels, by far the major sources of fuel are diesel and gasoline, both derived from crude oil production. Additionally, in recent years, electric vehicles have been gaining market share, but the cost for electric vehicles is still more expensive than fossil fueled equivalents and limitations exist regarding cost, recharge time, and primary resources for battery and energy storage. Given the weight of batteries, electric long-haul trucking is also challenged, and most long-haul truck manufacturers are in search of affordable, low- or negative-carbon options such as hydrogen-fueled trucking.

Natural hydrogen produced by enhanced hydrogen production reactions would be an answer to the low or negative-carbon, low cost, reliable transportation problem for long-haul trucking and potentially other forms of transportation. As for other types of transportation, natural hydrogen as a compressed or liquified product, or as a feedstock for synthetic liquid fuel ("efuels"), would be a reliable low cost, low or negative-carbon solution. Additionally, natural hydrogen could be combined with nitrogen to produce a carbon free ammonia product, which is being widely discussed as a potential replacement for bunker fuel for shipping and as a feedstock for synthetic fertilizer manufacturing.

Direct Emissions Reduction: Because there are no direct $CO_2$ emissions from the combustion or typical use of hydrogen, the reduction in $CO_2$ emissions is a function of what the hydrogen is replacing. In many cases, low or negative-carbon hydrogen would be replacing hydrogen from steam methane reforming (SMR) as a chemical feedstock for ammonia production, oil refining, and other chemical manufacturing. In some cases, low or negative-carbon hydrogen may replace natural gas, diesel fuel, gasoline, or jet fuel as a heat source or transportation fuel.

In the case of ammonia production and refining, natural gas is used to produce hydrogen via steam methane reformation reactions, which is used as a chemical feedstock in both the refining process and the ammonia production process. Today, more than 95% of hydrogen is produced using natural gas in steam methane reformers (SMRs). The carbon intensity of hydrogen production using SMRs without carbon capture is 10.4 tonnes of $CO_2$ emitted for each tonne of hydrogen produced. As such, direct replacement of natural hydrogen for hydrogen manufactured by SMR processes results in a $CO_2$ reduction of 10.4 tonnes $CO_2$/tonne $H_2$.

In power generation with gas turbines, hydrogen must displace the energy (btu) equivalent of natural gas. The energy density of hydrogen is 290 btu/cf or 51,682 btu/lb. By comparison, the energy density of natural gas is 983 btu/cf or 20,267 btu/lb, while the carbon intensity of natural gas is 52.91 kg $CO_2$/mmbtu $CH_4$ or 54.87 kg $CO_2$/mcf $CH_4$, or 3.5 kg $CO_2$/kg $CH_4$.

Because hydrogen is 2.6 times more energy dense per unit mass than natural gas, only 40% of the gross tonnage of fuel is required to achieve the same energy output. As such, burning one tonne of $H_2$ for power generation reduces natural gas consumption by ~2.6 tonnes, and thus $CO_2$ emissions by 9.1 tonnes.

Comparing natural hydrogen produced by enhanced hydrogen production reactions to hydrogen produced by electrolysis, the carbon reduction is a function of the carbon intensity of the power used in the electrolysis process. There are no direct emissions in the electrolysis process, but there may be large indirect emissions associated. However, natural hydrogen produced by enhanced hydrogen production reactions directly sequesters sulfur emissions and when enabled in combination with carbon dioxide directly sequesters carbon dioxide permanently in mineral form. As a result, there is a direct emissions reduction for sulfur or both sulfur and carbon dioxide as part of the EHP process. With respect to carbon dioxide in instances where $H_2S$ and $CO_2$ are involved in the EHP process, there is a direct emissions reduction of ~10 tonnes of $CO_2$ emitted for each tonne of hydrogen produced, as compared to electrolytically produced hydrogen (or other forms of hydrogen generation). Integration of this process achieves net carbon negative hydrogen production.

Indirect Emissions Reduction: An analysis of the lifecycle carbon intensity of natural hydrogen using the Oil Production Greenhouse Gas Emissions Estimator ("OPGEE") has shown the lifecycle carbon intensity of natural hydrogen to be in the range of 0.1 to 0.4 tonnes $CO_2$/tonne $H_2$ with an additional emissions reduction equivalent to the mass of carbon dioxide mineralized along with sulfur by the SCMEHP process. Similar studies are not available for other methods of hydrogen production. However, using an average grid intensity of 0.5 tonnes $CO_2$/MWh, and given that electrolysis requires approximately 50 MWh/tonne $H_2$ produced, the indirect emissions associated with electrolysis are about 25 tonnes $CO_2$/tonne $H_2$ produced assuming grid power. Of course, electrolysis unit operators can purchase Renewable Energy Credits (RECs) to synthetically reduce the carbon footprint of their power usage, but market recognition of this as a method for eliminating real time carbon emissions may not be permanent.

The realization of abundant natural hydrogen can achieve significant reductions in equivalent carbon emissions. The embodiments herein provide low-carbon hydrogen production techniques that utilize different injectate fluids heated from sources external to the geological system and rely on one or more of the pyritization or serpentinization reactions described in Table 1 and Table 2 below. The chemical components of the injectate fluid, the heat, or both, may be supplied from topside systems, such as waste from surface installations.

What is claimed is:

1. A method of producing hydrogen from a subsurface rock formation, the method comprising:
   heating a fluid including dihydrogen sulfide within a subsurface rock formation to stimulate an exothermic reaction of the fluid with components of the subsurface rock formation and produce a hydrogen reaction product, wherein the exothermic reaction comprises a pyritization reaction, and wherein the subsurface rock formation comprises an iron-rich rock;
   extracting the hydrogen produced from the reaction of the fluid with the subsurface rock formation; and
   utilizing at least one of heat produced from the exothermic reaction or the hydrogen product to generate mechanical energy, thermal energy, electrical energy, or chemical reactions.

2. The method of claim 1, wherein the fluid further includes at least one of water, steam, or a supercritical fluid.

3. The method of claim 1, wherein extracting hydrogen produced from the reaction of the fluid with the subsurface rock formation includes extracting heated water from the subsurface formation.

4. The method of claim 1, wherein the fluid is heated to between about 25° C. and about 500° C.

5. The method of claim 1, further comprising injecting a coolant into the subsurface formation, wherein the coolant comprises at least one of water or carbon dioxide.

6. The method of claim 1, wherein the mechanical energy, thermal energy, or electrical energy is generated by cycling the hydrogen through a gas turbine, the hydrogen through a fuel cell, or a heated fluid through a steam turbine.

7. The method of claim 6, wherein the heated fluid is configured to heat a secondary fluid and the secondary fluid is cycled through the steam turbine.

8. The method of claim 1, wherein the subsurface rock formation includes one or more of iron-rich rock, mafic igneous rock, metamorphosed or hydrothermally altered mafic igneous rock, olivine- or pyroxene-bearing igneous or metamorphic rock, metamorphosed or hydrothermally altered olivine- or pyroxene-bearing igneous rock, metamorphic rock, or serpentine mineral bearing rock, partially or completely serpentinized rock, serpentinite, pyrite, iron-rich sandstone, other iron-rich sedimentary rock, or iron-rich sediments.

9. The method of claim 1, wherein the subsurface rock formation comprises a fractured or acid treated porous rock.

10. The method of claim 1, wherein utilizing at least one of heat produced from the exothermic reaction or the hydrogen product to generate mechanical energy, thermal energy, electrical energy, or chemical reactions comprises using at least one of a steam generator, a turbine, a Rankin cycle plant, an Allam Cycle plant, an economizer, a boiler, or a superheater to generate the mechanical energy, thermal energy, electrical energy, or chemical reactions.

11. The method of claim 1, wherein the iron-rich rock comprises igneous or metamorphic basement rock.

12. The method of claim 1, wherein the iron-rich rock comprises one or more of mafic igneous rock, metamorphosed or hydrothermally altered mafic igneous rock, olivine- or pyroxene-bearing igneous rock, mafic rock, metamorphosed or hydrothermally altered olivine- or pyroxene-bearing igneous rock, or metamorphic rock.

13. An apparatus for producing hydrogen from a subsurface rock formation, the apparatus comprising:
  means for heating a fluid including dihydrogen sulfide within a subsurface rock formation to stimulate an exothermic reaction of the fluid with components of the subsurface rock formation and produce a hydrogen reaction product, wherein the exothermic reaction comprises a pyritization reaction, and wherein the subsurface rock formation comprises an iron-rich rock;
  means for extracting the hydrogen produced from the reaction of the fluid with the subsurface rock formation; and
  means for utilizing at least one of heat produced from the exothermic reaction or the hydrogen product to generate mechanical energy, thermal energy, electrical energy, or chemical reactions.

14. The apparatus of claim 13, wherein the fluid further includes at least one of water, steam, or a supercritical fluid.

15. The apparatus of claim 13, wherein the means for extracting the hydrogen includes means for extracting heated water from the subsurface formation.

16. The apparatus of claim 13, wherein the means for heating the fluid comprises means for heating the fluid to between about 25° C. and about 500° C.

17. The apparatus of claim 13, further comprising a means for injecting a coolant into the subsurface formation, wherein the coolant comprises at least one of water or carbon dioxide.

18. The apparatus of claim 13, further comprising means for generating the mechanical energy, thermal energy, or electrical energy by cycling the hydrogen through a gas turbine, cycling the hydrogen through a fuel cell, or cycling a heated fluid through a steam turbine.

19. The apparatus of claim 18, further comprising:
  means for using the heated fluid to heat a secondary fluid, and
  means for cycling the secondary fluid through the steam turbine.

20. The apparatus of claim 13, wherein the subsurface rock formation includes one or more of iron-rich rock, mafic igneous rock, metamorphosed or hydrothermally altered mafic igneous rock, olivine- or pyroxene-bearing igneous, or metamorphic rock, metamorphosed or hydrothermally altered olivine- or pyroxene-bearing igneous rock, metamorphic rock, or serpentine mineral bearing rock, partially or completely serpentinized rock, serpentinite, pyrite, iron-rich sandstone, other iron-rich sedimentary rock, or iron-rich sediments.

* * * * *